US008380199B2

(12) United States Patent
Hasegawa

(10) Patent No.: US 8,380,199 B2
(45) Date of Patent: Feb. 19, 2013

(54) MOBILE COMMUNICATION SYSTEM

(75) Inventor: Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 171 days.

(21) Appl. No.: 12/690,419

(22) Filed: Jan. 20, 2010

(65) Prior Publication Data

US 2010/0120434 A1 May 13, 2010

Related U.S. Application Data

(63) Continuation of application No. PCT/JP2007/064785, filed on Jul. 27, 2007.

(51) Int. Cl.
*H04W 36/00* (2009.01)
*H04W 4/00* (2009.01)
*H04L 12/56* (2006.01)

(52) U.S. Cl. ........ 455/436; 455/437; 455/438; 455/439; 370/331; 370/395.21

(58) Field of Classification Search .................. 455/436
See application file for complete search history.

(56) References Cited

U.S. PATENT DOCUMENTS

| 2004/0141491 | A1 | 7/2004 | Takei |
| 2005/0141477 | A1 | 6/2005 | Tomita et al. |
| 2007/0047493 | A1* | 3/2007 | Park et al. ............ 370/331 |
| 2008/0101295 | A1 | 5/2008 | Tomita et al. |
| 2009/0129335 | A1* | 5/2009 | Lee et al. ............ 370/331 |
| 2009/0156212 | A1 | 6/2009 | Motegi et al. |
| 2009/0279507 | A1 | 11/2009 | Kanazawa et al. |
| 2011/0299504 | A1 | 12/2011 | Tomita et al. |

FOREIGN PATENT DOCUMENTS

| JP | 2004235883 | 8/2004 |
| JP | 2004236294 | 8/2004 |
| JP | 2006245913 | 9/2006 |
| JP | 2007053805 | 3/2007 |
| JP | 2007129594 | 5/2007 |
| JP | 2007158538 A | 6/2007 |
| WO | 2004030396 A1 | 4/2004 |
| WO | 2007069319 A1 | 6/2007 |

OTHER PUBLICATIONS

TS 36.300 V8.0.0 (Mar. 2007) Evolved Universal Terrestrial Radio Access (E-UTRA) and Evolved Universal Terrestrial Radio Access Network (E-UTRAN); Overall description; Stage 2 (Release 8).
Japanese Notice of Reason for Rejection dated Nov. 15, 2011 issued in application No. 2009-525196.
Notice of Final Decision of Rejection dated Mar. 6, 2012 received in corresponding Japanese Patent Application No. 2009-525196.

* cited by examiner

*Primary Examiner* — Huy C Ho
(74) *Attorney, Agent, or Firm* — Murphy & King, P.C.

(57) ABSTRACT

A wireless base station connected together with another base station to a superior apparatus, comprises, a forwarding controller to forward data received from the superior apparatus to the mobile station in a case of receiving none of a handover request message from the mobile station connected to the wireless base station, and to forward a part or the whole of the data received from the superior apparatus to the another wireless base station after receiving the handover request message from the mobile station, and a notifying unit to notify the another wireless base station of information used for the another wireless base station determining a reception allowable period of the data forwarded from the wireless-base station.

13 Claims, 19 Drawing Sheets

FIG. 8

| ITEM | PARAMETER NAME | UNIT (EX.) | REMARKS |
|---|---|---|---|
| 1 | X2 USER DATA FORWARDING COMPLETION TIMER | mS | TARGET eNODE-B DISCARDS SUBSEQUENT VIA-Z2 USER DATA IF OVER TIMER VALUE |
| 2 | S1 USER DATA TRANSMISSION PERIOD DESIGNATING TIMER | mS | MME/SAE GATEWAY DOES NOT TRANSMIT USER DATA TO SOURCE eNODE-B IF OVER TIMER VALUE |

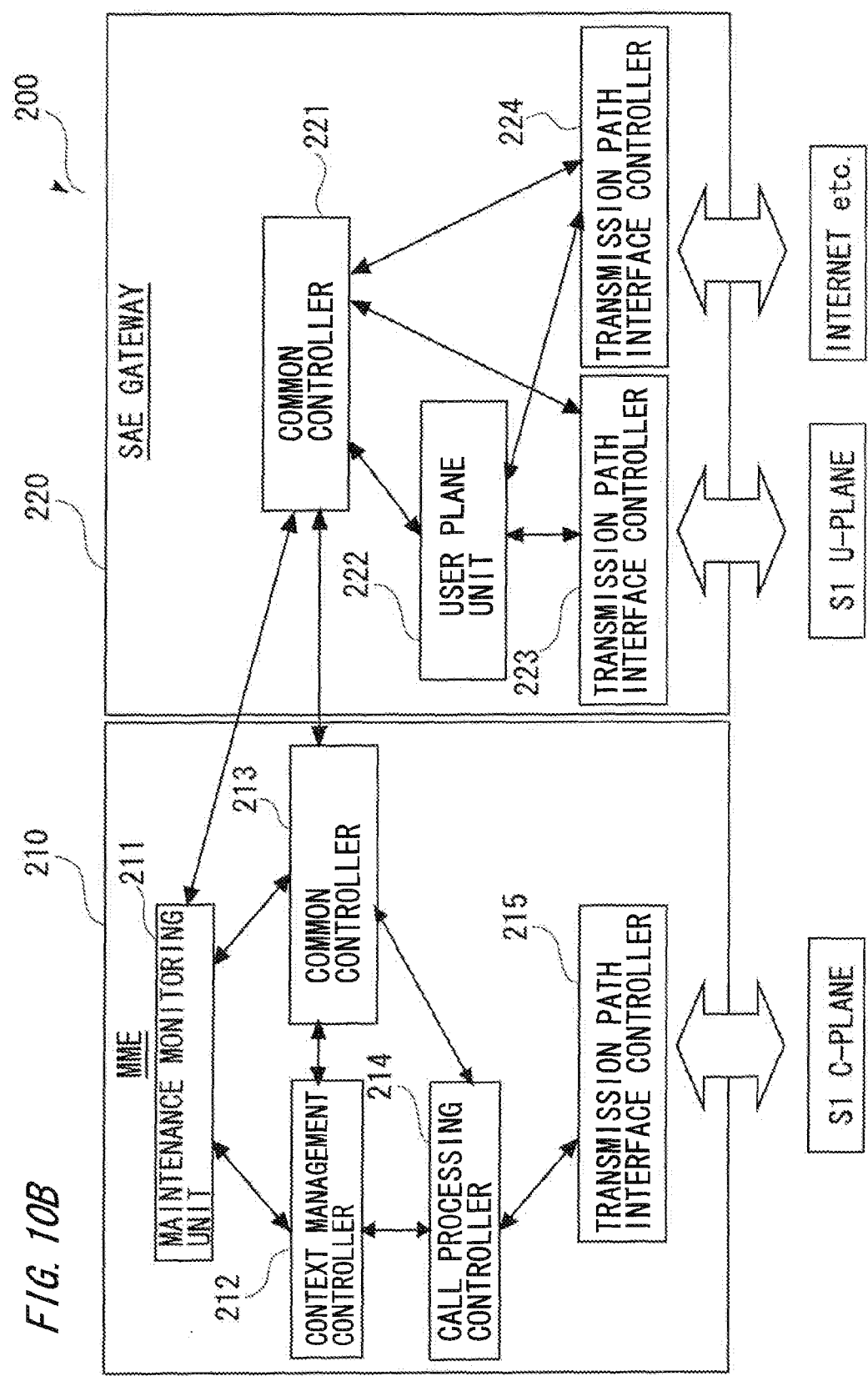

FIG. 11A
TABLE FOR SELECTING TIMER VALUE

| No. | QoS TYPE | TIMER VALUE (mS) | REMARKS |
|---|---|---|---|
| 1 | VoIP | 10 | FORWARDING PERIOD IS SHORT IF HIGH OF REAL TIME CHARACTERISTIC |
| 2 | VIDEO over IP | 0 | |
| 3 | STREAMING | 50 | FORWARDING PERIOD IS LONG IF STRONG OF DATA VALIDITY EVEN WHEN HAVING TIME FOR FORWARDING |
| 4 | WWW | 50 | |
| 5 | FTP | 100 | |

FIG. 11B
TABLE FOR SELECTING TIMER VALUE (S1/X2 INDEPENDENT TYPE)

| No. | INTERFACE TYPE | QoS TYPE | TIMER VALUE (mS) | REMARKS |
|---|---|---|---|---|
| 1 | S1 | VoIP | 10 | FORWARDING PERIOD IS SHORT IF HIGH OF REAL TIME CHARACTERISTIC |
| 2 | S1 | VIDEO over IP | 0 | |
| 3 | S1 | STREAMING | 50 | FORWARDING PERIOD IS LONG IF STRONG OF DATA VALIDITY EVEN WHEN HAVING TIME FOR FORWARDING |
| 4 | S1 | WWW | 50 | |
| 5 | S1 | FTP | 100 | |
| 6 | X2 | VoIP | 20 | VALUE TAKING ACCOUNT OF 10 MS AS DELAY OF X2 DATA TRANSMISSION FROM STOP TIME OF S1 |
| 7 | X2 | VIDEO over IP | 0 | |
| 8 | X2 | STREAMING | 60 | |
| 9 | X2 | WWW | 60 | |
| 10 | X2 | FTP | 110 | |

FIG. 11C

TABLE FOR SELECTING TIMER VALUE (OFFSET DESIGNATED TYPE)

| No. | INTERFACE TYPE | QoS TYPE | TIMER VALUE (mS) | REMARKS |
|---|---|---|---|---|
| 1 | S1 | VoIP | 10 | FORWARDING PERIOD IS SHORT IF HIGH OF REAL TIME CHARACTERISTIC |
| 2 | S1 | VIDEO over IP | 0 | |
| 3 | S1 | STREAMING | 50 | FORWARDING PERIOD IS LONG IF STRONG OF DATA VALIDITY EVEN WHEN HAVING TIME FOR FORWARDING |
| 4 | S1 | WWW | 50 | |
| 5 | S1 | FTP | 100 | |
| 6 | - | OFFSET | 10 | OFFSET VALUE TAKING INTO ACCOUNT DELAY WHEN USED FOR X2 INTERFACE |

FIG. 13

| QoS TYPE | | | | | MESUREMENT REPORT VALUE (AMOUNT OF DATA STREAM) | TIMER VALUE | REMARKS |
|---|---|---|---|---|---|---|---|
| VoIP | Data /Video | FTP/WWW | | | 0 – 100 kbps | 10 ms | |
| | | | | | 101 – 300 kbps | 15 ms | |
| — | | | | | 301 – 500 kbps | 20 ms | |
| — | — | | | | 501 – 1000 kbps | 25 ms | |
| — | — | — | | | 1001 – 100000 kbps | 30 ms | |
| — | — | — | | | 1000001 kbps – Max | 40 ms | |

PARAMETERS FOR CALCULATION OF FORWARDING TIMER (EXAMPLE) /60

| No. | ITEMS | | PARAMETERS | REMARKS |
|---|---|---|---|---|
| | QoS TYPE | PAPAMETER NAME | | |
| 1 | COMMON | TIMER REFERENCE VALUE | 1 [mS] | 1 – 10ms |
| 2 | COMMON | TIMER SETTING MAXIMUM VALUE | 100 [mS] | |
| 3 | VoIP | MAXIMUM DATA RATE | 12.6 kbps | |
| 4 | | MAXIMUM DATA RATE | 0 kbps | |
| 5 | | PRIORITY VALUE | 1.0 | |
| 6 | | CALCULATION PERIOD | 5 | |
| 7 | FTP | MAXIMUM DATA RATE | 1000 kbps | |
| 8 | | MAXIMUM DATA RATE | 0 bps | |
| 9 | | PRIORITY VALUE | 0.1 | [0.1 – 1.0 RANGE] 0.1 STEP |
| 10 | | CALCULATION PERIOD | 10 | |
| ... | ... | ... | ... | ... |
| N | | | | |

FIG. 16

CALCULATION FORMULA $$ForwardingPeriodTimerValue =$$

$$Timer\ Reference\ Value \times \frac{TrafficVolumeMeasurementResult(ReportedValue)}{Range\ per\ QoS} \times$$

$$priorityValue(\text{parameter A})$$

$$Range\ per\ QoS = \frac{(ParameterMaximumDatarate - ParameterMinimumDatarate)}{Parameter"CalculationPeriod"}$$

*NOTE: IF FORWARDING PERIOD TIMER VALUE IS LARGER THAN "TIMER SET MAXIMUM VALUE", SET MAXIMUM VALUE IS SET AS CALCULATION VALUE.

MOBILE COMMUNICATION SYSTEM

CROSS-REFERENCE TO RELATED APPLICATION

This is a continuation of Application PCT/JP2007/064785, filed on Jul. 27, 2007, now pending, the entire contents of which are herein wholly incorporated by reference.

FIELD

The present invention relates to a mobile communication system including a wireless base station which realizes a packet switching service and also to a technology of forwarding user data directed to a mobile station to handover target wireless base station from a handover source wireless base station when in a handover process accompanying migration of the mobile station across between service areas.

BACKGROUND

In the mobile communication system of the present generation (e.g., the third generation (3G)), a system configuration (a service area range) is built up extremely widely. The mobile station's being capable of migrating (moving) across between the respective service areas is an inevitable function to the mobile communication system. A process in which the mobile station migrates across between the service areas (the process of switching over a wireless base station to which the mobile station is wirelessly connected) is generally called a handover process. The handover process involves adopting a technology enabling a target mobile station to migrate across between the service areas so as to keep seamless communications between the handover target mobile station and the connected base station, in which an end user is provided with a stressless service with no disconnection of the communications.

In an LTE (Long Term Evolution) system also of which specifications are developed as one of candidates for the next generates mobile communication system, definitions of a handover function and a related control system are underway by way of one of seamless communication technologies as a concomitant of the migration of the mobile station across between the service areas (the development of the specifications is underway).

According to the handover specifications that are currently examined and developed in the LTE system, what is examined is a method of forwarding transmission data directed to the mobile station to a handover target wireless base station device from a handover source wireless base station device with respect to the migration of the mobile station across between the wireless base stations each configuring its service area (cell).

FIG. 1 is a diagram illustrating one example of configuration for the LTE system. As illustrated in FIG. 1, the LTE system includes a plurality of wireless base station devices (eNode-B (eNB)) and an MME/SAE gateway (MME/SAE Gateway) corresponding to a superior apparatus above the eNB) each holding the wireless service area.

The MME/SAE gateway is connected via an S1 interface to the eNB. Further, the eNBs (nodes) are connected to each other via an X2 interface.

The MME/SAE gateway handles termination of a NAS (Non-Access Stratum) signal, management of the mobile station (UE: User Equipment) in an idle status, management of an SAE bearer resource, and so on.

The eNB handles call control and wireless (radio frequency: RF) control, and has functions such as RRC (Radio Resource Control), an S1 interface access point (S1-AP) and an X2 interface access point (X2-AP).

[Non-patent document 1] TS 36.300 V8.0.0 (2007-03) Evolved Universal Terrestrial Radio Access (E-UTRA) and Evolved Universal Terrestrial Radio Access Network (E-UTRAN); Overall description; Stage 2 (Release 8)

[Patent document 1] Japanese Patent Laid-Open Publication No. 2007-53805

In the next generation mobile communication system, however, for effectively utilizing finite resources such as wireless resources (for improving frequency usage efficiency), there is a progress of development of specifications based on a premise of the shared channel allocation (the wireless CH (channel) is shared) without following logic of the individual channel resource allocation as adopted in the existing system such as W-CDMA.

FIG. 2 is an explanatory diagram illustrating one example of the shared channel allocation (one example of (OFDMA (Orthogonal Frequency Division Multiple Access). In the case of the logic of the shared channel allocation such as the OFDMA wireless technology illustrated in FIG. 2, the resource allocation to a user is not always guaranteed on both of a frequency base and a time base. Hence, there is a possibility in which the user might get into such an event that the user is not provided with want-to-receive resource allocation when required. Further, in a handover process also, it is difficult for the handover source base station and the handover target base station to allocate the same frequency resource at the same timing to the target mobile station, with the result that the handover is carried out basically by a channel switching method.

The handover scheme of the channel switching method, however, entails keeping continuity of the data on the mobile station and preventing a loss of data during the handover process. What is examined for attaining this is a method (which is called a [data forwarding process]) of forwarding the user data for the mobile station to the handover target base station from the handover source base station so that the data directed to the mobile station is not lost to the greatest possible degree when in the handover process.

SUMMARY

A first aspect is a mobile communication system including: a first wireless base station connected to a superior apparatus and serving as a handover source station for a mobile station; and a second wireless base station connected to the host device superior apparatus and serving as a handover target station for the mobile station, the mobile station establishing a wireless connection with one of the first and second wireless base stations by use of a wireless channel shared between or among a plurality of mobile stations, wherein the first wireless base station forwards data received from the superior apparatus and addressed to the mobile station to the mobile station in a case of receiving none of a handover request message from the mobile station keeping the wireless connection with the first wireless base station itself, and the first wireless base station forwards a part or a whole of the data received from the superior apparatus after receiving the handover request message to the second wireless base station in the case of receiving the handover request message from the mobile station and transmitting a handover process request message in response to this handover request message to the second wireless base station, the second wireless base station forwards, through a handover process corresponding to the handover process request message sent from the first wireless base station, both of the data forwarded from the first wireless base station and the data transmitted from the superior apparatus and addressed to the mobile station by switching over a data transmission destination in the superior apparatus through the handover process to the mobile station of which the wireless connection with the first wireless base station is switched over to the wireless connection with the second wireless base station itself, and the first wireless base station notifies the second wireless base station of information used for the second wireless base station to determine a reception allowable period of the data forwarded from the first wireless base station.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 8 is a table depicting one example of timer information (Timer Information) on a data forwarding period designating timer value.

FIG. 10B is a diagram illustrating an example of a configuration of an MME/SAE gateway (superior apparatus).

FIG. 11A is a diagram illustrating one example (S1/X2 common entry) of a timer value selection table used for determining the data forwarding period designating timer value.

FIG. 11B is a diagram illustrating one example (S1/X2 individual entry) of the timer value selection table used for determining the data forwarding period designating timer value.

FIG. 11C is a diagram illustrating one example (S1 individual entry/X2 offset value) of the timer value selection table used for determining the data forwarding period designating timer value.

FIG. 13 is a diagram illustrating an example of a table stored with the timer value associated with the data stream size (traffic volume);

FIG. 15 is a diagram illustrating an example of a table stored with a plurality of parameters needed for calculating the timer value;

FIG. 16 is a diagram illustrating an example of a calculation formula used for calculating the timer value.

DESCRIPTION OF EMBODIMENTS

Embodiment of the present invention will hereinafter be described with reference to the drawings. Configurations in the following embodiments are exemplifications, and the present invention is not limited to the configurations in the embodiments.

[Circumstances of the Invention]

Figure 3:
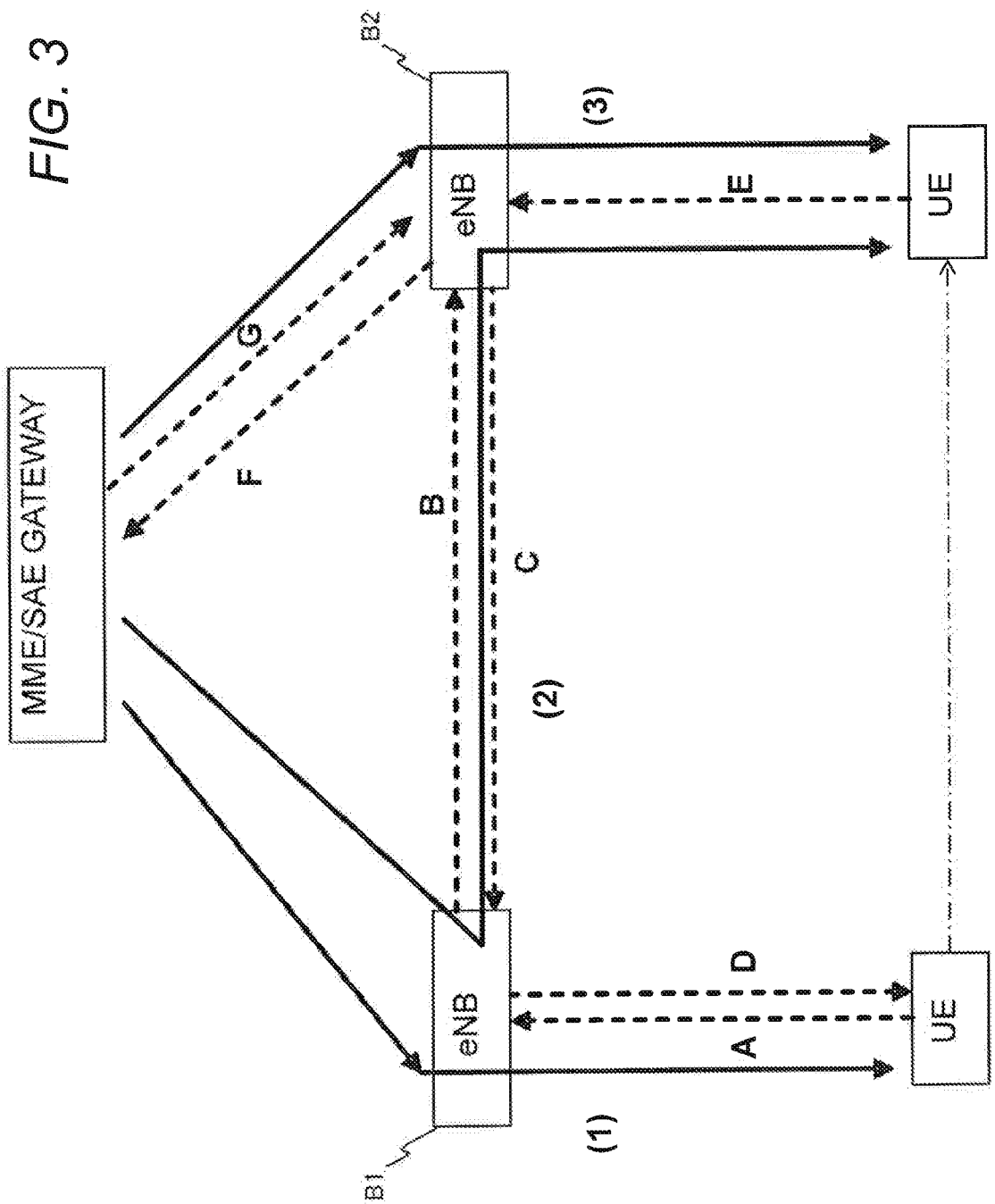
FIG. 3 is an explanatory diagram illustrating a concept of a handover process between base stations in the next generation mobile communication system (e.g., the LTE system).

FIG. 3 is an explanatory diagram of a concept of a handover process between base stations in a next generation mobile communication system (e.g., an LTE system). The example illustrated in FIG. 3 depicts how two wireless base stations (eNB: evolved Node B) B1 and B2 are connected to an MME/SAE (Mobile Management Entity/Systems Architecture Evolution) gateway (which is also called MME/UPE (Mobile Management Entity/User Plane Entity) Gateway), and a mobile station (UE: User Equipment) conducts migration (handover) to a service area of the base station B2 from the service area of the base station B1.

The handover across between the base stations is generally called an inter-base-station handover (Inter eNB Handover). In the inter-base-station handover, a handover source base station is called a source eNB (Source eNB) (which will hereinafter be termed the "source base station" as the case may be). Further, a handover target base station is called a target eNB (Target eNB) (which will hereinafter be termed the "target base station" as the case may be).

In FIG. 3, when in the handover process, the base station B1 becomes the source base station (HO source), while the base station B2 becomes the target base station (HO target). Further, FIG. 3 illustrates data forwarding routes (1)-(3) of data (user data) on a user plane (User Plane) from a point before a start of the handover to a point after completion of the handover, and also depicts messages A-G transmitted and received on a control plane (C-Plane) when in the handover process.

Figure 4:
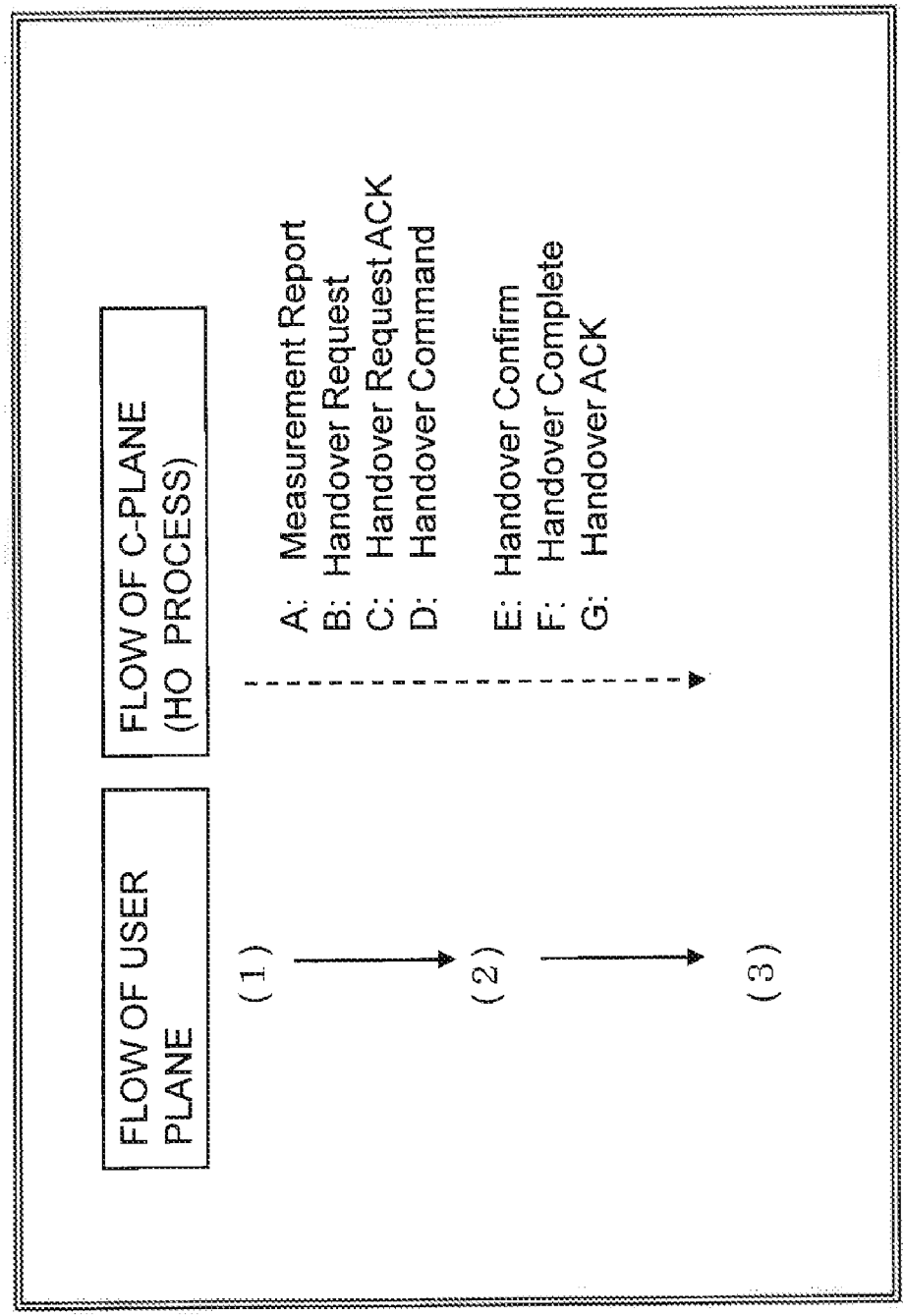
FIG. 4 is an explanatory diagram of a call process and a user data forwarding process that are related to the handover illustrated in FIG. 3.

In FIG. 3, the mobile station (user equipment (UE)) establishing a call (call setup) with the base station B1 migrates to the service area (target area) of the HO-target base station B2, on which occasion a call process and a user data forwarding process are executed on the user plane and the control plane respectively in an example of procedures illustrated in FIG. 4.

To give a detailed description, in FIGS. 3 and 4, if the mobile station connects with the base station B1 in the service area (which is a zone where the mobile station can transmit and receive radio signals to and from the base station B1), the data (user data) on the user plane, which is transmitted from the MME/SAE gateway in a downlink direction, is forwarded to the mobile station via the base station B1 (refer to the route (1) indicated by an arrowhead of a solid line in FIG. 3).

Thereafter, in the course of the migration of the mobile station from the service area (source area) of the base station B1 to the service area (target area) of the target base station, the inter-base-station handover process is executed. During the handover process, the user data transmitted from the MME/SAE gateway to the base station B1 (source base station) is forwarded to the base station B2 (target base station) from the base station B1 and further forwarded from the target base station to the mobile station (refer to the route (2) indicated by the arrowhead of the solid line in FIG. 3).

Thereafter, upon termination of the handover process, the user data transmitted from the MME/SAE gateway to the base station B2 (target base station) is forwarded to the mobile station via the target base station (refer to the route (3) indicated by the arrowhead of the solid line in FIG. 3).

On the other hand, as depicted in FIGS. 3 and 4, with the migration from the source area to the mobile station in the target area, on the control plane, a "Measurement Report" functioning as a handover (HO) startup request message of the mobile station is forwarded to the base station B1 from the mobile station (see a message "A" in FIGS. 3 and 4).

The base station B1 receiving the "Measurement Report" and serving as the source base station transmits a "Handover Request" functioning as an inter-base-station HO startup/HO line establishing request message to the base station B2 defined as the target base station (target base station B2) (see a message "B" in FIGS. 3 and 4).

The base station B2 receiving the "Handover Request" and serving as the target base station captures a line for the handover, and transmits a "Handover Request ACK" defined as an acknowledgment message in response to the "Handover Request" to the base station B1 (source base station B1) as the source base station (refer to a message "C" in FIGS. 3 and 4).

The source base station B1 receiving the "Handover Request ACK" transmits a message "Handover Command" as a HO command to the mobile station (refer to a message "D" in FIGS. 3 and 4).

The source base station B1 transmitting the "Handover Command" switches over a forwarding destination of the user data received from the MME/SAE gateway to the target base station B2.

On the other hand, the mobile station receiving the "Handover Command" executes a channel switchover process (connecting process) to the target base station B2 from the source base station B1. When finishing the connecting process (the switchover of the connecting destination base station), the mobile station transmits, to the target base station B2, a HO completion report message "Handover Confirm" indicating the completion of the HO process of the mobile station (refer to a message "E" in FIGS. 3 and 4).

The target base station B2 receiving the "Handover Confirm" transmits a message "Handover Complete" representing the completion of the HO process to the MME/SAE gateway (see a message "F" in FIGS. 3 and 4).

The MME/SAE gateway receiving the "Handover Complete" transmits, to the target base station B2, a completion acknowledgement message "Handover ACK" in response to the "Handover Complete" (refer to a message "G" in FIGS. 3 and 4). Thereafter, the MME/SAE gateway switches over the forwarding destination of the user data addressed to the mobile station to the target base station B2 from the source base station B1.

The target base station B2, for example, after the connecting process with the mobile station, forwards the user data transferred from the source base station B1 to the mobile station (the route (2) in FIG. 3). After receiving the "Handover ACK", the target base station B2 forwards the user data received from the MME/SAE gateway to the mobile station (the route (3) in FIG. 3).

In the HO process described above, the process in an time period (the route (2) in FIG. 3) at which the user data is forwarded from the source base station B1 to the target base station B2, is called a data forwarding (Data Forwarding) process. With respect to the data forwarding process, mainly it is a matter of concern the following problems exist at the present.

(1) The target base station B2 (Target eNB) is disabled from knowing a termination point of the user data (forwarding data) forwarded to the target base station B2 from the source base station B1 in the data forwarding process.

(2) A forwarding period of the data forwarded between the base stations is not defined.

An embodiment, which will hereinafter be described, is configured to aim at solving mainly the problem (2) given above.

Normally, with respect to the user data addressed to the mobile station when in the inter-base-station handover process, the target base station has a possibility of receiving the user data from two routes at the maximum. Types of the two routes are given as follows.

<1> The user data forwarded via an X2 interface from the OH source base station (source base station (S-eNB)).

<2> The data newly transmitted, after the HO process, from the MME/SAE gateway via an S1 interface.

In a transitional period of the handover process, the target base station is requested to execute the following processes each defined as the process of transmitting the user data to the mobile station (UE: User Equipment).

[1] The transmitting process of transmitting the data received via the X2 interface to the mobile station is preferentially executed.

[2] After completing the data transmitting process via the X2 interface, the new data received via the S1 interface is transmitted toward the mobile station.

Figure 1:
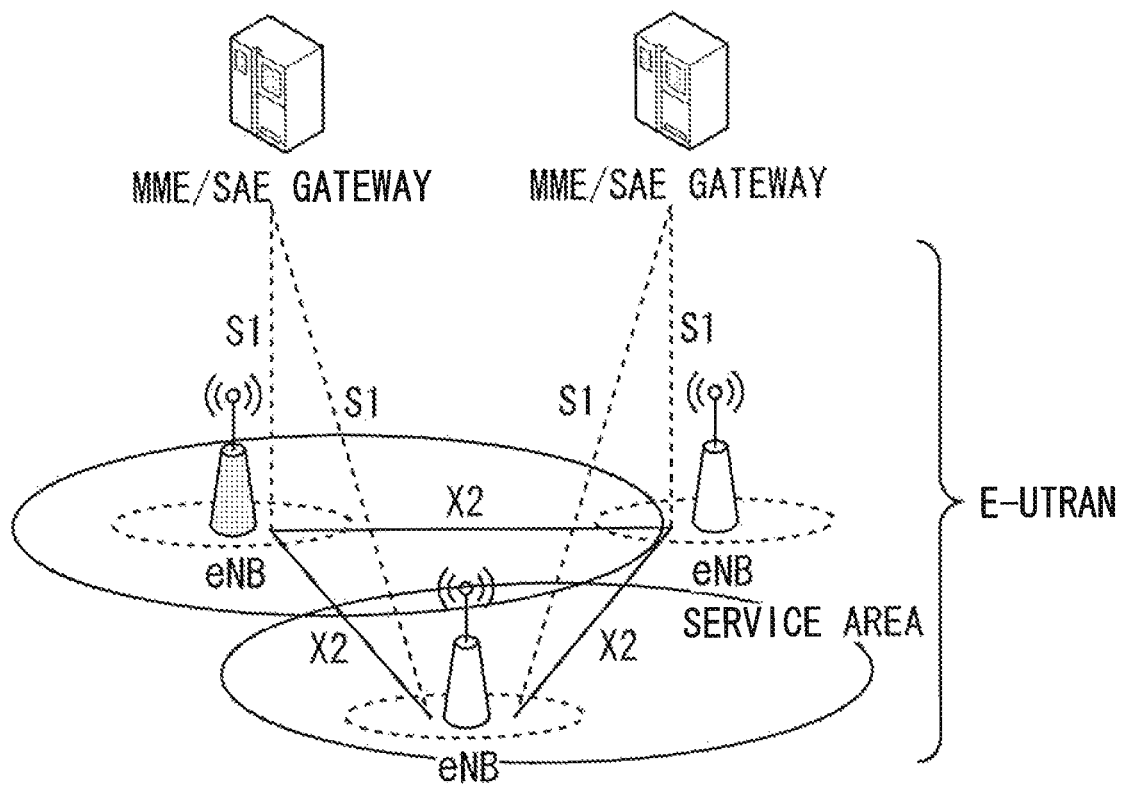
FIG. 1 is a diagram illustrating one example of an LTE system.

In the LTE system having the network configuration as illustrated in FIG. 1, however, it is considered that an IP (Internet Protocol) network is applied to establishing a transmission path for a connection between the base stations and a transmission path for a connection between the MME/SAE gateway (which will hereinafter be simply referred to as the "gateway" as the case may be) and the base station.

Therefore, the target base station can not necessarily start the process of transmitting the data from the S1 interface to the mobile station after the completion of receiving the data from the X2 interface.

For example, an assumption is that the target base station determines that the process of transmitting the user data packet (user packet) received from the X2 interface is completed and starts the process of transmitting the user packet received from the S1 interface. At this time, if the handover process is not perfectly completed, such a case might happen that the user packet arrives via the X2 interface due to a fluctuation and/or a delay in the transmission path (IP network) between the base stations.

The target base station is requested to execute the process of transmitting the delay packet as well. Hence, the target base station is required to ensure a buffer capacity for receiving the data (packets) from the X2 interface and to take into consideration a load process such as controlling a data (packet) transmission sequence.

It is therefore a matter of request to increase the buffer size for the X2 interface in the base station device. This case results in rises in scale and cost of the base station.

[Outline of Embodiment]

One of the principal objects of the embodiment lies in solving the foregoing problem (2) "the forwarding period of the data forwarded between the base stations is not defined". A scheme of the embodiment involves defining the period (forwarding period) required for forwarding the data between the devices (apparatuses) and sharing information on the forwarding period between the devices with respect to the handover target mobile station in between the base stations executing the handover process when handed over in the next generation mobile communication system (e.g., the LTE system). This scheme enables the load process to be reduced (where, e.g., the necessity for the sequence control is eliminated, and the buffer size is restrained from increasing) in each device by restraining the futile data transfer.

In the embodiment, the handover source base station (source base station) transmits necessary pieces of information (messages and parameters) toward the device (the MME/SAE gateway or another base station (which becomes the target base station) connected via the S1 interface or the X2 interface.

Figure 5:
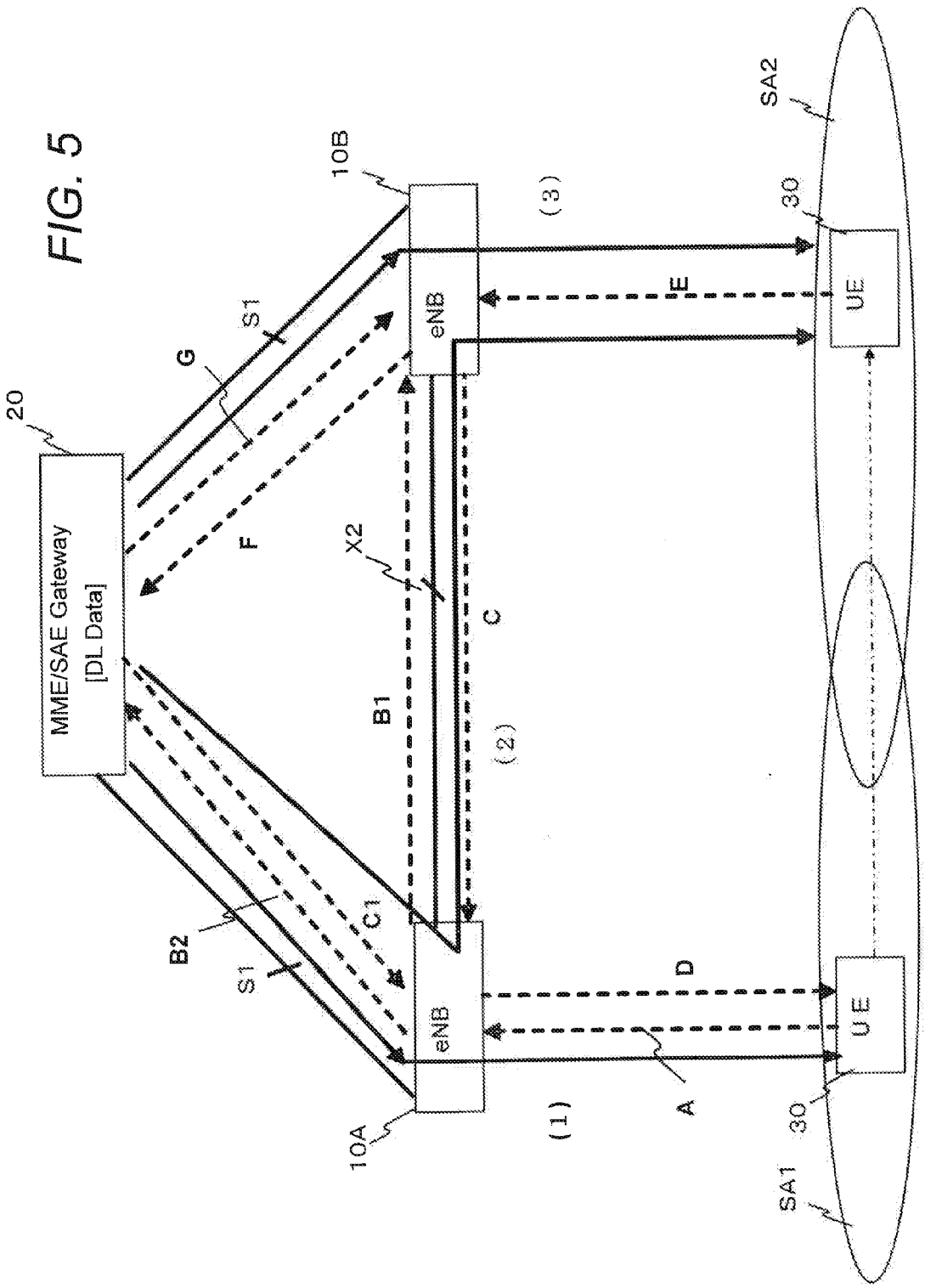
FIG. 5 is an explanatory diagram illustrating outlines of configuration and an operation of the mobile communication system in an embodiment.
Figure 6:
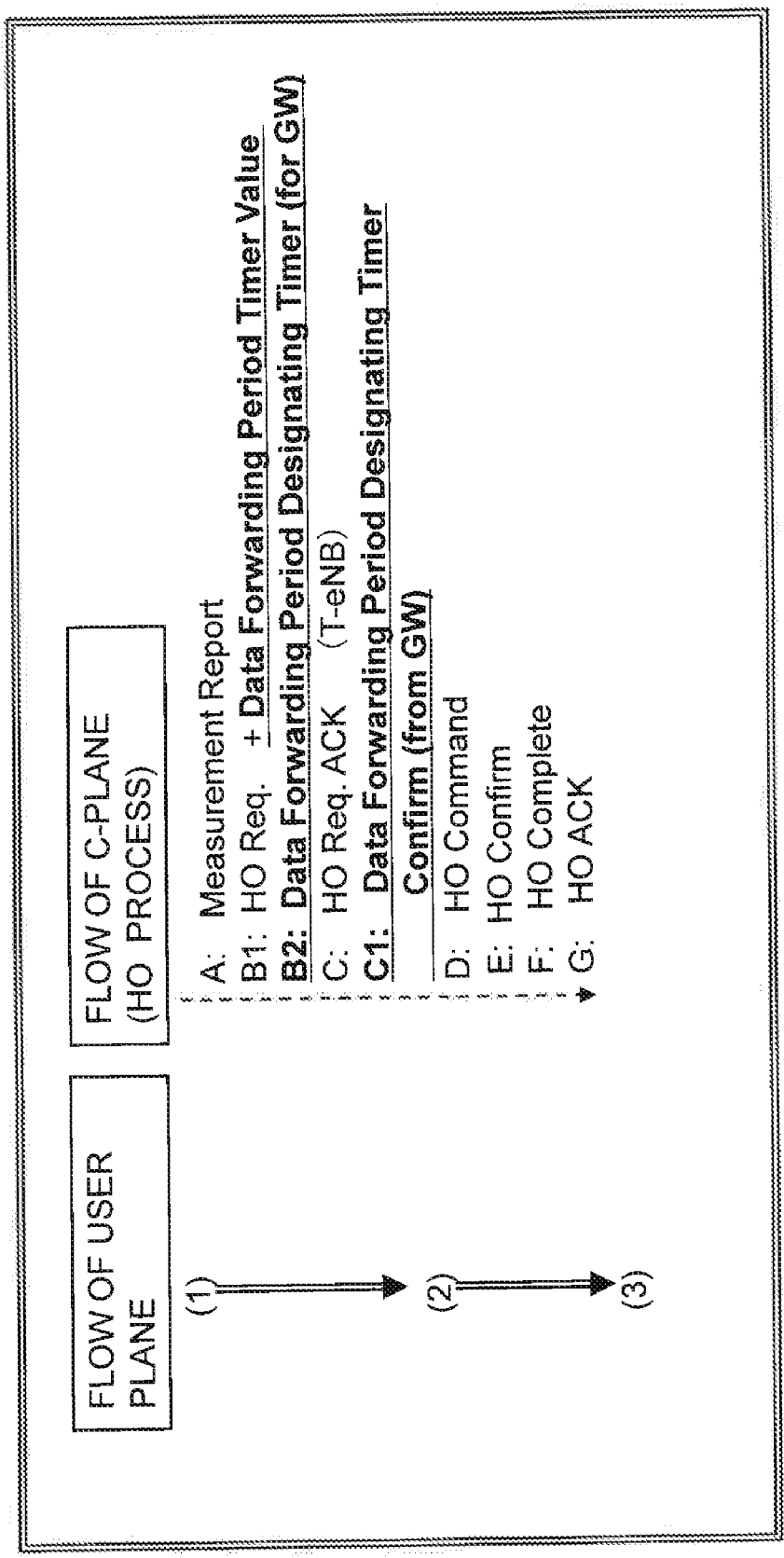
FIG. 6 is a diagram illustrating an operation flow on a user plane and a control plane in the mobile communication system illustrated in FIG. 5.

FIG. 5 is an explanatory diagram illustrating outlines of examples of the configuration and the operation of the mobile communication system according to the embodiment. FIG. 6 is a diagram illustrating an example of an operation flow on the user plane and the control plane in the mobile communication system illustrated in FIG. 5.

Note that the data flow and the message flow depicted in FIG. 5 include the same flows in the mobile communication system illustrated in FIG. 3, in which flows of parameters/messages B1, B2 and C1 are added to the configuration including the data forwarding routes (1)-(3) and the messages A-G illustrated in FIG. 3.

In FIG. 5, the mobile communication system is equipped with a network system including a plurality of wireless base stations (eNB) 10A and 10B each executing the inter-base-station handover (Inter eNB Handover) and an MME/SAE gateway 20 (gateway 20) defined as a superior apparatus above the respective base stations 10A and 10B.

Further, the mobile communication system includes a mobile station (UE) 30 performing the communications through the call connection with the base station when the mobile station 30 resides in a zone of the service area of the base station, in which the mobile station behaves as a user (terminal) in the network including the plurality of base stations 10A and 10B and the gateway 20 described above.

In FIG. 5, to begin with, the mobile station 30 resides in a service area SA1 and establishes a call (connection) with the base station 10A, at which time the mobile station 30 gets into a status of receiving the user data forwarded in the downlink direction via the base station 10A from the gateway 20. Namely, the mobile station 30 receives the user data on the route (1) indicated by the arrowhead of the solid line in FIG. 5.

Thereafter, the mobile station 30 moves (migrates) toward a service area SA2 of the base station 10B and eventually enters the service area SA2. Herein, the mobile station 30 measures a reception level of the radio signals from each base station at any time, and determines that a handover condition is satisfied if, e.g., the reception level of the radio signals from another base station (the base station 10B) is higher than the reception level of the radio signals from the base station (the base station 10A) with which the self-station (the mobile station 30) currently connects and if a difference between the two reception levels exceeds a threshold value.

If the handover condition is satisfied, the mobile station 30 transmits a HO startup request message ("Measurement Report") (the message "A" in FIGS. 5 and 6) to the base station 10A (the source base station 10A). At this time, the source base station 10A executes a process of transmitting the parameter or the message for controlling the user data forwarding period toward the handover destination base station (the target base station: the base station 10B) and the gateway 20 ("B1" and "B2" in FIGS. 5 and 6). Moreover, the source base station 10A receives a response to the parameter or the message "B2" from the gateway 20 (the message "C" in FIGS. 5 and 6).

The following is discussion on an outline of operating procedures when handed over in the mobile communication system illustrated in FIG. 5. In the following discussion, the base station 10A is the source base station, while the base station 10B is the target base station.

(Procedure 1) The source base station (Source eNB) 10A, which receives the "Measurement Report" defined as the HO startup request message from the mobile station device (mobile station 30), transmits the HO startup/HO line establishing request message (handover process request message) "Handover Request" related to the relevant mobile station (mobile station 30) to the target base station (Target eNB) 10B (the message "B1" in FIGS. 5 and 6).

At this time, the source base station 10A makes the "Handover Request" contain the message or the parameter (which is the information for determining a reception allowable period) indicating the period (forwarding period) of forwarding the user data toward the X2 interface. The message indicating the forwarding period contains, e.g., a parameter: a data forwarding period designating timer value (Data Forwarding Period Timer Value).

(Procedure 2) The target base station 10B executes the handover process which includes ensuring and establishing a handover resource (line) for the mobile station 30 on the basis of the "Handover Request" received from the source base station 10A. At this time, the target base station 10B determines the reception allowable period of the forwarding data (Forwarding Data) received from the X2 interface in relation to this X2 interface started up corresponding to the "Handover Request". The reception allowable period can be determined by use of the data forwarding period (the data forwarding period designating timer).

A scheme that the target base station receives the "Handover Request" containing the forwarding period as illustrated in FIG. 5, can be applied to the handover in the data forwarding period. A substitute for this scheme can involve applying another scheme that the target base station receives a message (containing the forwarding period) different from "Handover Request". A reception timing of the forwarding period can be properly determined within a range in which the target base station can determine a proper receiving period (termination of the reception) of the forwarding data from the X2 interface.

The procedure 2 enables the target base station 10B to recognize or determine the reception allowable period (a receiving process finishing timing) of the user data required to be received via the X2 interface on the basis of the forwarding period. The termination of the reception allowable period can be determined by setting the timer which indicates the reception allowable period. A timer value may involve applying the data forwarding period designating timer value in a status quo and can involve applying a different timer value determined based on the data forwarding period designating timer value.

(Procedure 3) The source base station 10A, in the case of receiving the "Measurement Report" from the mobile station 30 and performing the startup of the handover line with respect to the target base station 10B (in the case of transmitting the "Handover Request"), transmits a message containing a transmission stop request of downlink (DL) transmission data addressed to the mobile station 30 (which is referred to as a "transmission stop request message": "B2" in FIGS. 5 and 6) to the in-connection gateway 20. The transmission stop request message can contain, as one of the parameters, the data forwarding period designating timer value which indicates the data forwarding period (forwarding data accept period) to the target base station 10B in the source base station 10A.

The source base station 10A is requested to transmit (forward) the user data given as below to the target base station 10B during the HO process.

(A) One type of the transmission-requested user data is downlink data addressed to the mobile station 30 in the process of the handover (HO) and also the user data (including the data, the acknowledgement (delivery confirmation) of which could not be obtained) that could not be transmitted to the mobile station 30 before a wireless channel (downlink) with the mobile station 30 is disconnected (the wireless channel is switched over to the target base station 10B).

(B) Another type of the transmission-requested user data is the user data newly arriving from the gateway 20 via the S1 interface during the HO process after disconnecting the wireless downlink with the mobile station 30 (after switching over the wireless channel).

With respect to the user data (B) (the new transmission-requested data), the gateway 20 is notified of the data forwarding period designating timer information (which is the information for determining the data transmission stop timing) indicating the user data forwarding acceptable period (forwarding period) in the source base station in the form of the transmission stop request message "B2" in order to restrain the futile transfer.

Note that this type of transmission stop request message is optional but is not an indispensable constructive requirement.

(Procedure 4) The gateway 20 receiving the transmission stop request message "B2" explained in the Procedure 3 recognizes, based on the message "B2", the data forwarding period designating timer information (timer value) sent from the source base station 10A. Thereafter, the gateway 20 transmits the acknowledgement message (the message "C1" in FIGS. 5 and 6: data forwarding period designating timer acknowledgement) in response to the message "B2" to the source base station 10A.

At this time, the gateway 20 determines, based on the data forwarding period designating timer information contained in the message "B2", a user data transmissible period (transmission stop timing) for the source base station 10A. The transmission stop timing can be determined by setting, e.g., a transmissible period timer. A set timer value may involve applying the data forwarding period designating timer value in the status quo and can involve applying a different timer value determined based on the data forwarding period designating timer value. Thereafter, the gateway 20 stops transmitting the user data toward the S1 interface (the source base station 10A), the transmission stop being triggered by an excess of the transmissible period timer value. Note that a start of forwarding the user data via the S1 interface set up with the target base station 10B may also be triggered by the excess of the timer value.

It should be noted that the acknowledgement message "C1" is not an indispensable message, and an applicable scheme is that the source base station 10A does not make a request for any response to the transmission stop request message "B2".

The procedures 3 and 4 enable the source base station 10A to specify the transmission period of the user data for the S1 interface (the gateway 20). Both of the source base station 10A and the target base station 10B are not thereby requested to be aware of the futile data forwarding period (to retain the futile data receiving standby status).

The procedures ranging from the reception of the message "C" (HO request ACK) by the source base station 10A from the target base station 10B up to the completion of the HO process are the same as the procedures which have already been described with reference to FIGS. 3 and 4. Namely, the normal handover process (UE-oriented line startup establishing confirmation/HO transition process/Ho completion process (Path Switch) is carried out.

According to the procedures 1-4 described above, the data forwarding period can be restrained (reduced) in the wireless base station (eNB) and the superior apparatus (MME/SAE Gateway) when handed over in the mobile communication system. The following effects are considered as effects acquired by the user data forwarding method based on the procedures 1-4.

(a) The target base station 10B can receive the new parameter (the data forwarding period designating timer value) for distinguishing between the data forwarding period given from the X2 interface and the data forwarding period given from the S1 interface.

Hence, in the transitional period of the HO process where branches of both of the X2 interface and the S1 interface are started up, the target base station 10B can mark off a priority level (the priority is given to any one of X2 and S1) of the data transmission to the mobile station 30 with a fixed period of time (reception time) based on the data forwarding period. The target base station 10B is not thereby required to uselessly wait for the arrival of the user data from the X2 interface. Namely, it is feasible to save the buffer size for the X2 interface.

Further, the target base station 10B can start, based on such a premise that the user data from the X2 interface does not arrive after the excess (timeout) of the set timer based on the data forwarding period designating timer value, transmitting the user data received from the S1 interface.

(b) The source base station 10A can designate the data forwarding period acceptable period for the gateway 20. This enables the source base station 10A to autonomously execute adjustment of the user data required to be forwarded to the target base station 10B. Accordingly, the source base station 10A has no necessity for preparing the futile forwarding buffer (Forwarding Buffer (S1-X2). The buffer capacity is thereby saved.

(c) The timer value related to the data forwarding period is not requested to be set unique. Therefore, each of the data forwarding period designating timer value set for the X2 interface (the target base station) and the data forwarding period designating timer value set for the S1 interface (the gateway) can have different lengths. Further, the data forwarding period designating timer value can be determined based on, e.g., a call type (QoS: Quality of Service) and a real data stream size (Traffic Volume Measurement). A flexible (Flexible) system operation can be thereby realized.

(d) The realization can be comparatively easily attained by utilizing the wireless base station (eNode-B) assumed in an actual situation.

(e) The target base station 10B has no necessity for being aware of the user data sent from the X2 interface, which comes in at the time beyond the assumed range. Hence, a futile (low-efficiency) sequence control function (e.g., an interrupt process of the data forwarding process from the X2 interface during the process of transmitting the data from the S1 interface) can be omitted. With this scheme, a development quantity of the eNode-B device can be decreased.

SPECIFIC EXAMPLES

The embodiment discussed above will be described in greater detail.

Operational Example

Figure 7:
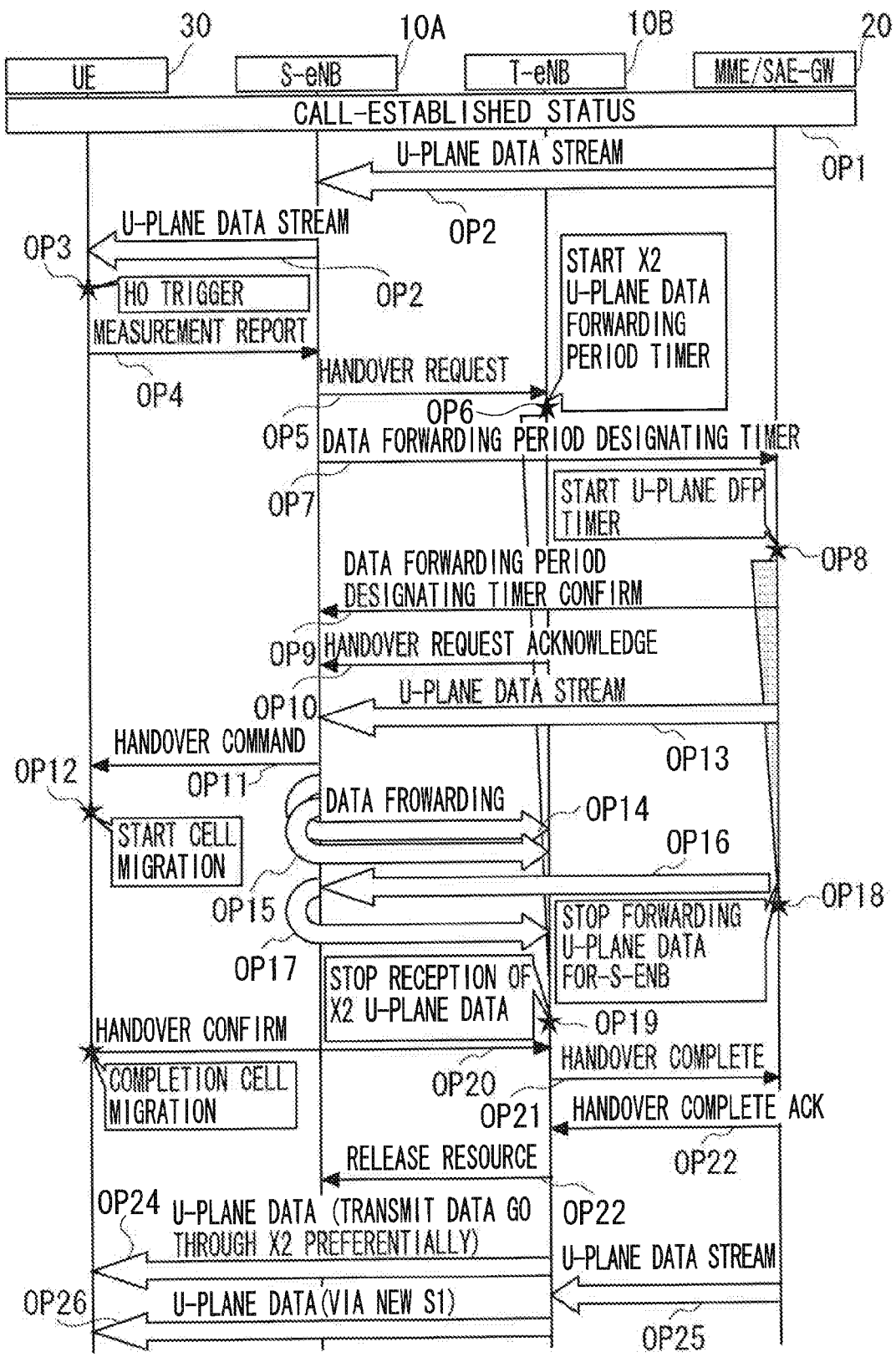
FIG. 7 is a sequence diagram illustrating one example of a flow of control signal (message) and a flow of user data when in the handover process with area-migration of a mobile station.

FIG. 7 is a sequence diagram illustrating one example of a control signal (message) and a flow of user data (user data stream) when in the handover process with the area-migration of the mobile station.

In FIG. 7, in a status where the mobile station (UE) 30 connects with the base station 10A (source base station: S-eNB) and the call is established (FIG. 7: OP (operation) 1), the data (user) on the user plane, which is sent from the MME/SAE gateway (MME/SAE-GW) 20, is transmitted to the mobile station 30 via the base station 10A (FIG. 7: OP2).

With the migration of the mobile station 30, when the HO condition is satisfied (HO trigger occurs) (FIG. 7: OP3), the mobile station 30 transmits the message "Measurement Report" to the base station 10A (FIG. 7: OP4, which corresponds to the message "A" in FIG. 5).

The base station 10A, upon receiving the "Measurement Report", transmits the message "Handover Request" containing the data forwarding period designating timer value to the base station 10B (target base station: T-eNB) (FIG. 7: OP5, which corresponds to the message "B1" in FIG. 5). Thus, the target base station is notified of the forwarding period through the "Handover Request" functioning as the forwarding period notifying message.

The base station 10B executes the handover process inclusive of acquiring the line and ensuring the resource related to the mobile station 30 on the basis of the "Handover Request". Further, the base station 10B starts up the X2 interface with the base station 10A and thus starts an X2 user plane data forwarding period designating timer which measures the forwarding period of the user data arriving via this X2 interface on the basis of the data forwarding period designating timer value contained in the "Handover Request" (FIG. 7: OP6).

On the other hand, the base station 10A transmits a message (a transmission stop request message (a forwarding period notifying message)) containing the data forwarding period designating timer value to the MME/SAE gateway 20 (FIG. 7: OP7, which corresponds to the message "B2" in FIG. 5).

The MME/SAE gateway 20 starts, based on the data forwarding period designating timer value, the user plane data forwarding period timer (FIG. 7: OP8)

The MME/SAE gateway 20 transmits an acknowledgement message in response to the transmission stop request message to the base station 10A (FIG. 7: OP9, which corresponds to the message "C1" in FIG. 5).

The base station 10B, upon ensuring the line for HO, transmits an acknowledgement message "Handover Request Acknowledge" in response to the "Handover Request" to the base station 10A (FIG. 7: OP10, which corresponds to the message "C" in FIG. 5).

The base station 10A receiving the "Handover Request Acknowledge" transmits a HO command message "Handover Command" to the mobile station 30 (FIG. 7: OP11, which corresponds to the message "D1" in FIG. 5).

The mobile station 30 receiving the "Handover Command" starts migrating across the cell (cell migration) (FIG. 7: OP12). Namely, the mobile station 30 cancels the channel with the base station 10A and establishes the channel with the base station 10B (the mobile station 30 switches over the wireless channel).

On the other hand, the base station 10A stops forwarding the user data (FIG. 7: OP13) sent from the MME/SAE gateway 20 to the mobile station 30 at a certain timing after receiving the "Handover Request Acknowledge", the start of which is triggered by, e.g., receiving the "Handover Request Acknowledge", then buffers the user data in a buffer (buffer for forwarding) for the transmission to the X2 interface, and starts forwarding the buffered user data toward the X2 interface (i.e., the base station 10B), the start of which is triggered by, e.g., transmitting the "Handover Command" (FIG. 7: OP14). The stop timing of transmitting the user data to the mobile station 30 and the start timing of forwarding the user data to the base station 10B can be, however, properly set.

The base station 10A forwards the user data accumulated in the forwarding buffer (FIG. 7: OP15) and forwards the user data (FIG. 7: OP16) newly received from the MME/SAE gateway 20 (FIG. 7: OP17).

The MME/SAE gateway 20 transmits, till the user plane data forwarding period timer comes to the timeout, the user data, which should be transmitted to the mobile station 30, to the base station 10A via the S1 interface. When the user plane data forwarding period timer comes to the timeout, the MME/SAE gateway 20 stops transmitting the user data to the base station 10A (FIG. 7: OP18).

Thereafter, the MME/SAE gateway 20 buffers the user data that should be transmitted to the mobile station 30 till starting up the S1 interface with the base station 10B defined as the target base station and starting the process of transmitting the user data to the S1 interface.

The base station 10B executes, till the X2 user plane data forwarding period timer comes to the timeout, the process of receiving the user data coming in from the base station 10A (the X2 interface) (buffering in the buffer (buffer for X2) for forwarding to the mobile station 30). When the X2 user plane data forwarding period timer comes to the timeout, the base station 10B stops the process of receiving the user data coming in from the base station 10A (the X2 interface). Namely, the base station 10B discards the user data arriving after the timeout.

Figure 2:
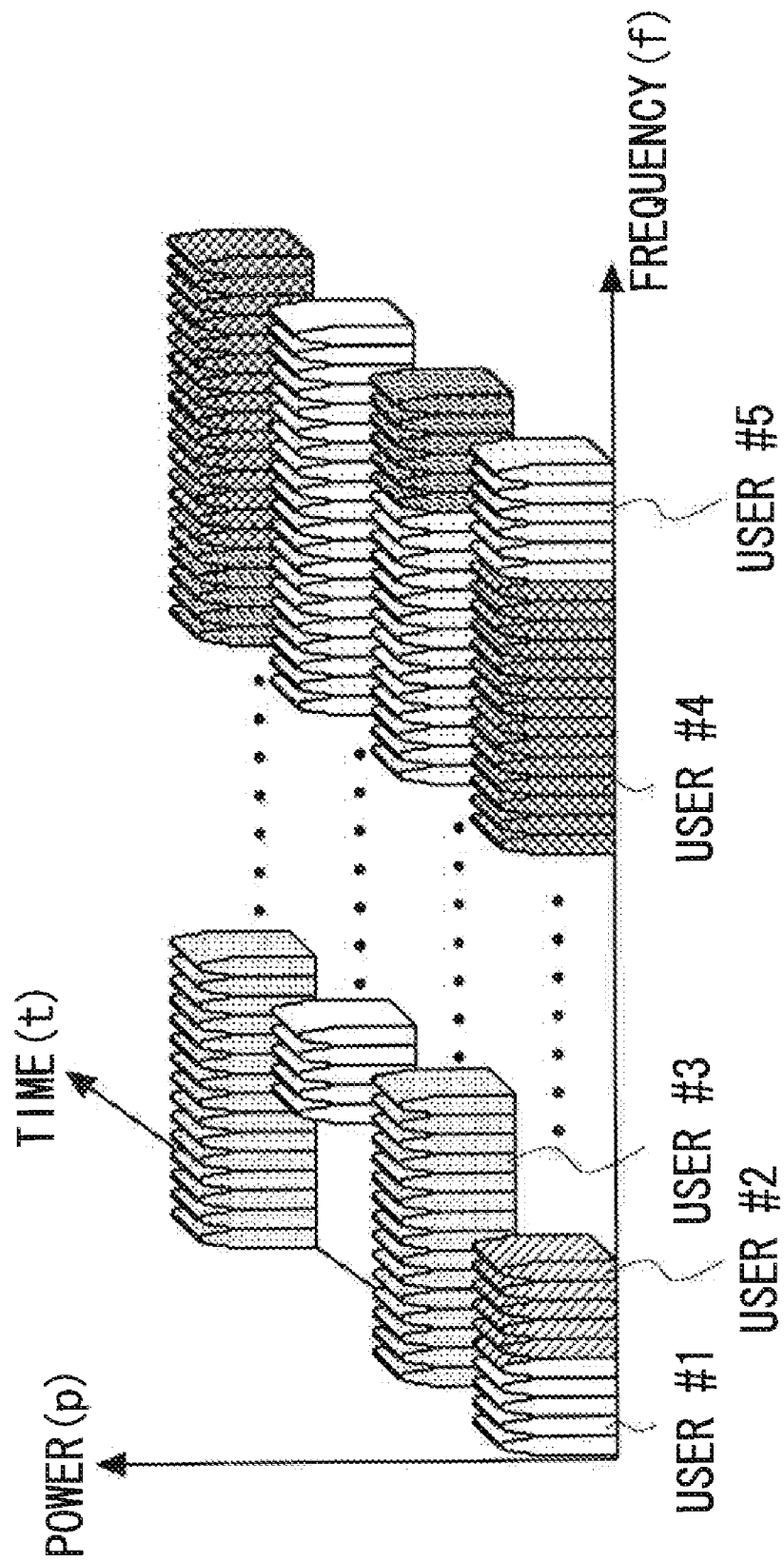
FIG. 2 is a diagram illustrating an example of how a shared channel is allocated to each individual user in OFDMA.

In the example illustrated in FIG. 2, the timer within the MME/SAE gateway 20 comes to the timeout faster than the timer within the base station 10B, then, before the timer of the base station 10B reaches the timeout, the base station 10A finishes the process of forwarding the user data sent from the MME/SAE gateway 20, and the set timer values (time values of the timers) in the base station 10B and the MME/SAE gateway 20 are adjusted so that the base station 10B can buffer all the user data forwarded from the base station 10A.

The mobile station 30, upon finishing the HO process (the channel switchover etc) based on the HO command, transmits the HO process completion report message "Handover Confirm" to the base station 10B (FIG. 7: OP20, which corresponds to the message "E" in FIG. 5).

The base station 10B receiving the "Handover Confirm" transmits a message "Handover Complete" representing the completion of HO to the MME/SAE gateway 20 (FIG. 7: OP21, which corresponds to the message "F" in FIG. 5). The S1 interface between the base station 10B and the MME/SAE gateway 20 is thereby started up.

The MME/SAE gateway 20 receiving the "Handover Complete" transmits an acknowledgement message "Handover Complete ACK" in response to this received message to the base station 10B (FIG. 7: OP22, which corresponds to the message "G" in FIG. 5).

The base station 10B receiving the "Handover Complete ACK" transmits a message "Release Resource" representing an instruction of releasing the X2 interface to the base station 10A (FIG. 7: OP23). At this point of time, the inter-base-station HO process is terminated.

Thereafter, the base station 10B transmits the buffered user data sent from the X2 interface to the mobile station 30 (FIG. 7: OP24). Further, the base station 10B transmits the user data received via the S1 interface from the MME/SAE gateway 20 ((FIG. 7: OP25) to the mobile station (FIG. 7: OP26). The base station 10B transmits preferentially the user data sent from the X2 interface rather than the user data sent from the S1 interface to the mobile station 30.

According to the operational example illustrated in FIG. 7, the timer value (the data forwarding period designating timer value) for designating the data forwarding period is transmitted to each of the target base station 10B defined as the user data forwarding target station, the MME/SAE gateway 20 defined as the transmission source station of the user data toward the mobile station from the source base station (base station 10A).

The target base station (base station 10B) can define a user data reception allowable period of the user data sent via the X2 interface from the source base station on the basis of the received timer value. Hence, for example, after starting the process of transmitting to the mobile station 30 the user data received from the new S1 interface started up with the MME/SAE gateway, such a necessity is eliminated as to receive a delay packet due to a delay on the transmission path from the X2 interface. It is therefore feasible to avoid intricacy of the sequence control of the transmission data toward the mobile station.

Further, the source base station (base station 10A) can specify a user data transmission period (a forwarding data accept period) for the MME/SAE gateway 20 of the user data transmission source station. With this scheme, termination (end point) of receiving the forwarding data from the S1 interface during the HO process is controlled, thereby enabling the data reception to be controlled (it follows that the data to be forwarded only is restrained). Accordingly, the source base station comes to have no necessity for being mounted with the futile data forwarding buffer.

Note that the operational example illustrated in FIG. 7 has given the exemplification that the "Handover Request" contains the X2 data forwarding period designating timer value. The X2 data forwarding period designating timer value can be transmitted as a single message different from the "Handover Request".

A message (a transmission stop request message, FIG. 7: OP7, the message "B2" in FIG. 5), which is transmitted to the MME/SAE gateway from the source base station and contains the data forwarding period designating timer value, is a new message.

It should be noted that an applicable scheme is a scheme of notifying only the target base station of the forwarding period designating timer without applying the transmission of the transmission stop request message. In this case also, the target base station can know the end point (the termination of the reception allowable period) of the user data coming in from the X2 interface, thereby enabling the futile data reception standby status to be restrained.

<<Timer Information>>

FIG. 8 is a table depicting one example of timer information (Timer Information) on the data forwarding period designating timer value. An entry 1 in the table of FIG. 8 represents a parameter (X2 user data forwarding completion timer) corresponding to the data forwarding period designating timer value contained in the "Handover Request" illustrated in FIG. 7, and an entry 2 depicts a parameter (S1 user data transmission period designating timer) corresponding to the data forwarding period designating timer value contained in the data forwarding period designating timer (the transmission stop request message) sent to the MME/SAE gateway illustrated in FIG. 7.

<<Example of Configuration of Mobile Station>>

Figure 9:
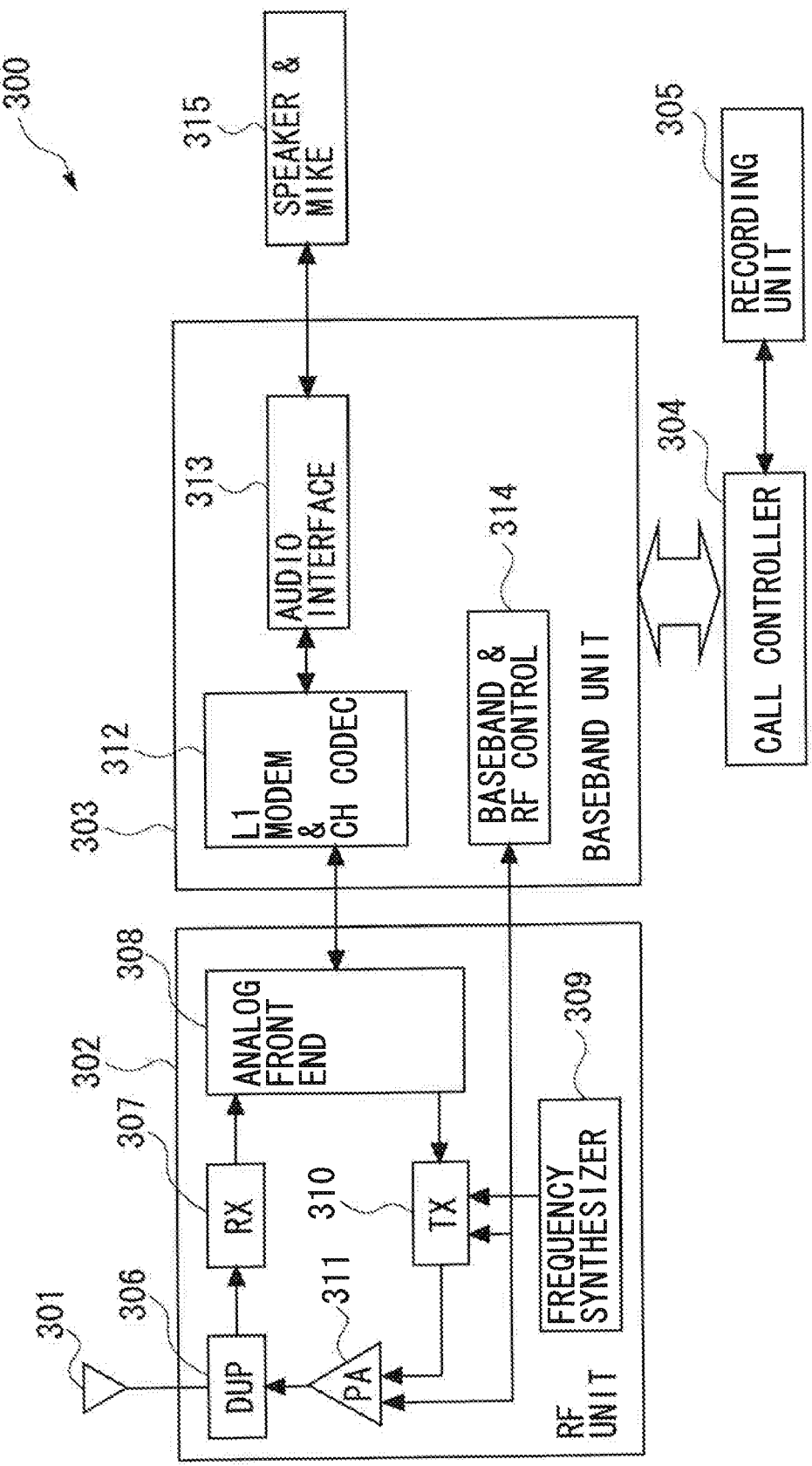
FIG. 9 is a diagram illustrating an example of a configuration of a mobile station device.

FIG. 9 is a diagram illustrating an example of the mobile station device, which can be applied to the mobile station 30 illustrated in FIGS. 5 and 7. In FIG. 9, the mobile station 30 includes a transmitting/receiving antenna 301, a radio frequency unit (RF unit) 302 which handles a process related to the radio signals transmitted and received via the antenna 301, a baseband unit 303 which handles a process for baseband signals, a call controller 304, a recording unit (storage) 305 and a voice input/output unit 315 including a speaker and a microphone.

The RF unit 302 includes a duplexer 310 which is connected to the antenna 301 and duplexes transmission waves and the reception waves, a receiver (RX) 307 which executes a process of converting a reception signal output from the duplexer 310 into the baseband signal, an analog front end 308 which executes an A/D (Analog-Digital) converting process of the signal output from the receiver 307 and a D/A (Digital-Analog) converting process of the baseband signal inputted from the baseband unit 303, a transmitter (TX) 310 which executes a process of modulating a transmission signal output from the analog front end 308 into a radio frequency by use of a frequency component generated by a frequency synthesizer 309, and a power amplifier 311 which amplifies the radio signals sent from the transmitter 310.

The baseband unit 303 includes a modulation/demodulation unit (an L1 (wireless interface) modem and a channel codec) 312 which obtains multiple data such as voice data and control data through a demodulation process of the baseband signal inputted from the analog front end 308 and modulates the should-be-transmitted voice signal into the baseband signal, an audio interface 313 which handles interface conversion between the modulation/demodulation unit 312 and the voice I/O unit 315, and a baseband/RF control unit 314 which controls operations (a process related to OFDM signal) of the RF unit 302 and the baseband unit 303.

The call control unit 304 is a function unit that performs wireless channel management, quality management, mobility management, etc by using the control data (messages etc) obtained from the baseband unit 303 and a variety of data and programs stored in the recording unit 305. The call control unit 304 can be configured by employing, e.g., a general-purpose or dedicated processor device (CPU (Central Processing Unit), DSP (Digital Signal Processor), etc). The call control unit 304 analyzes the control data (messages) and parameters received from the base station and executes a process (of generating the message and the parameter) corresponding to an analyzed result.

A configuration of the mobile station device is not limited to the example in FIG. 9 but can involve applying any types of mobile station devices considered to be applied to the LTE system in the present situation.

<<Example of Configuration of Base Station Device>>

Figure 10A:
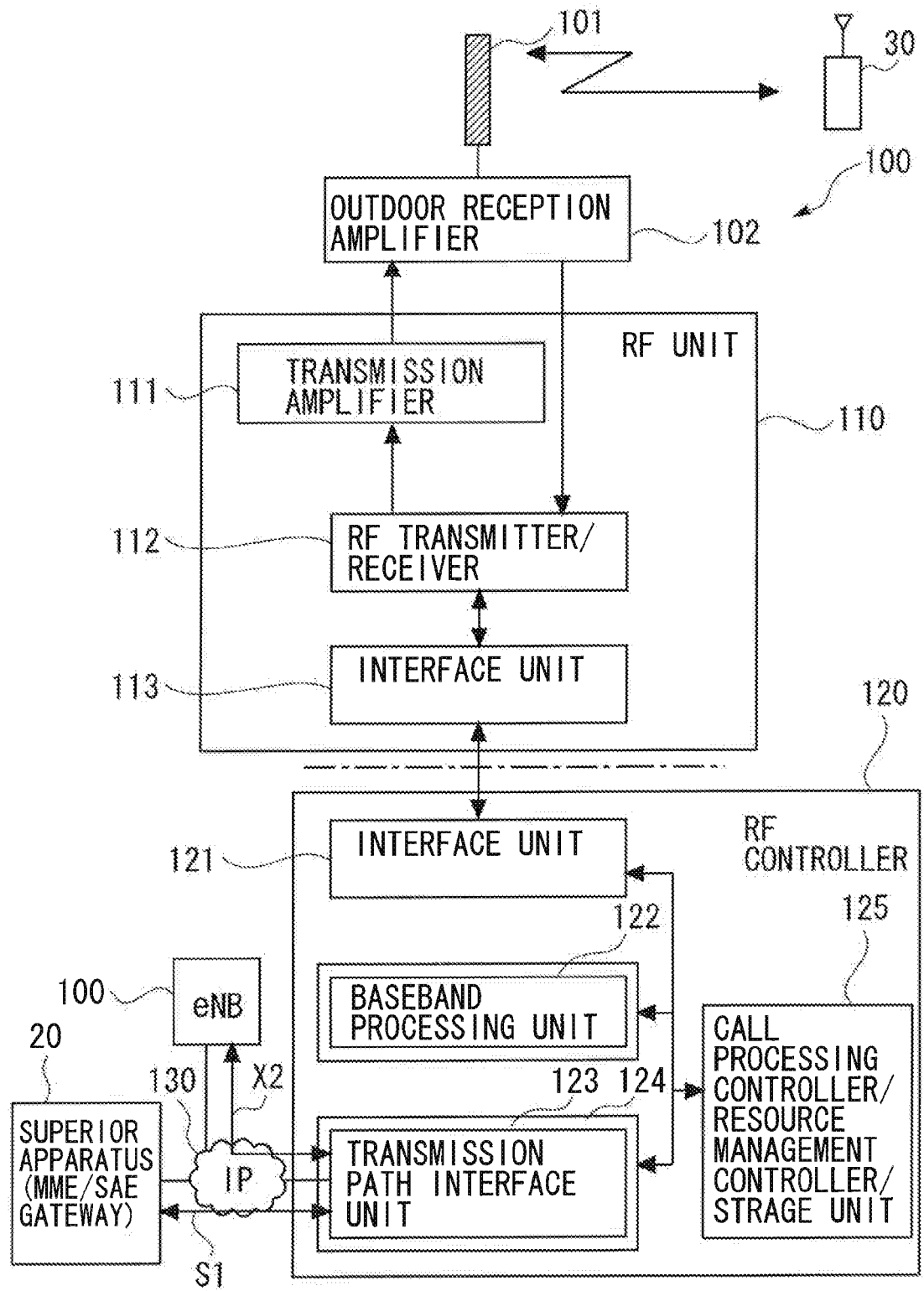
FIG. 10A is a diagram illustrating an example of a configuration of a wireless base station device.

FIG. 10A is a diagram illustrating an example of a configuration of a base station device 100 usable as the base stations 10A, 10B depicted in FIGS. 5 and 7. In FIG. 10A, the base station device (base station apparatus) 100 includes a transmitting/receiving antenna 101, an outdoor reception amplifier 102 which amplifies the radio waves received by the transmitting/receiving antenna 101, a radio frequency unit 110 which handles a process related to the radio signals transmitted and received by use of the transmitting/receiving antenna 101, and a radio frequency (RF) controller 120 which handles the control over the RF unit 110.

The RF unit 110 includes a transmission amplifier 111 corresponding to the power amplifier 311 illustrated in FIG. 9, an RF transmitter/receiver 112 having functions as the receiver 307, the frequency synthesizer 309 the transmitter 310 and the duplexer 310 depicted in FIG. 9, and an interface unit 113 which handles the interface function with the RF controller 113.

The RF controller 120 includes an interface unit 121 which handles the interface function with the RF unit 110, a baseband processing unit having functions of the modulation/demodulation unit 312 and the baseband/RF controller 314 illustrated in FIG. 9, an IP processing unit 124 containing a transmission path interface unit 123 which handles a process of transmitting and receiving the IP packet on an IP transmission path 130, and a controller 125 (a forwarding controller, a determining unit) which controls the operations of the interface unit 121, the baseband processing unit 122 and the IP processing unit 124.

The base station device 100 is connected via the IP transmission path 130 to other base station devices 100 and a superior apparatus (MME/SAE gateway 20). The S1 interface and the X2 interface described above are generated on this IP transmission path 130.

The controller 125 is constructed of, e.g., the processor device (the CPU, the DSP, etc), the storage device (storage) stored with the data and the programs, an input/output interface, etc, and functions as a call process controller 127 (FIG. 12) which handles a process related to at least a communication call established with the mobile station, a resource management unit that manages a wireless resource (common wireless channel), and a parameter storage unit (storage unit) stored with the parameter (table) needed for calculating the timer value. The controller 125 may be realized by a single circuit unit and may also be realized by a plurality of circuit units.

Figure 12:
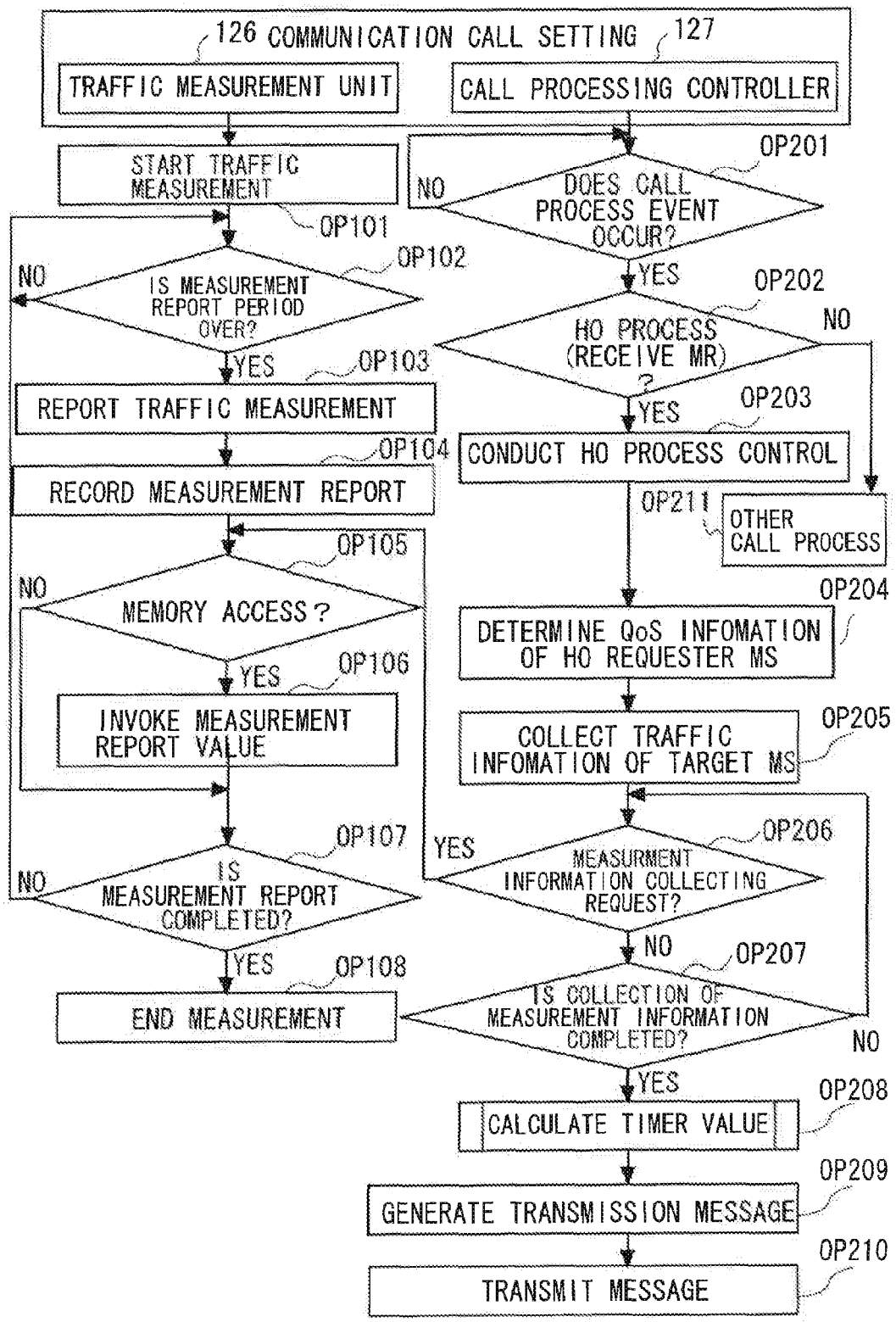
FIG. 12 is a flowchart illustrating an operational example of a method of determining a timer value corresponding to a data stream size (traffic volume) directed to the mobile station.

Moreover, in the baseband processing unit 122 and the transmission path interface unit 123, a traffic volume about the mobile station 30 is measured. Namely, the baseband processing unit 122 and the transmission path interface unit 123 have a function as a traffic measuring unit 126 (FIG. 12).

The controller 125 conducts a process of generating, transmitting and receiving the interface message with respect to the connection target base station and the MME/SAE gateway and also the base station control accompanying the reception of the message.

To be specific, the controller 125 analyzes the messages sent from the mobile station, the target base station and the MME/SAE gateway, generates the parameters (the data forwarding period designating timer values etc.) corresponding to the results of analyzing the messages, generates the messages, controls the transmission of the messages, determines a stop of transmitting the user data to the source base station, determines the start/stop of forwarding the user data to the target base station, and so on.

(Example of Configuration of MME/SAE Gateway)

FIG. 10B is a diagram illustrating an example of a configuration of an MME/SAE gateway device 200 that is applicable to the MME/SAE gateway 20.

The MME/SAE gateway device 200 is a combination of an MME device 210 and an SAE gateway device 220. The MME device 210 includes a maintenance monitoring unit 211, a context management controller 212, a common controller 213, a call processing controller 214 (a determining unit) and a transmission path interface controller 215 (a message transmitting unit and a message receiving unit).

The SAE gateway device 220 includes a common controller 221, a user plane unit 222, a transmission path interface controller 223 and a transmission path interface controller 224.

The maintenance monitoring unit 211 handles the management of the parameters common to the MME/SAE, the monitoring/control of the device, a maintenance monitoring device connection control function, and so forth. The context management controller 212 handles the management of details and a status of the line started up with the mobile station, the management of a context with the SAE interface, etc.

The call process controller 214 manages a NAS (Non Access Stratum) and controls the S1-C (the S1 interface of the control plane). The call processing controller 214 analyzes the message "B2" explained in FIGS. 5 and 7, executes a process (a timer setting process) of determining the transmission stop timing (the forwarding accept period of the source base station), and controls the generation and the transmission of the response message "C1".

The common controller 213 handles an MME/SAE common control function. The transmission path interface controller 215 handles the S1-C directed transmission path control. The transmission path interface controller 215 transmits and receives the messages "B2" and "C1".

The common controller 221 handles an SAE-side common control function. The user plane unit 222 controls and manages the user data. The user plane unit 222 executes a process of switching over the transmission target (destination) of the user data addressed to the mobile station (a process of stopping transmitting the user data to the source base station and starting transmitting the user data to the target base station) in accordance with an instruction (transmitted via, e.g., the common controllers 213 and 221) given from the call processing controller 214.

The transmission path interface controller 223 manages the interface with the transmission path directed to the S1-U (the S1 interface of the user plane). The transmission path interface controller 223 sends the user data to the transmission target base station. The transmission path interface controller 224 handles the management of the connection interfaces with the host node of the SAE gateway and with other MME/SAE gateways.

Note that the configuration illustrated in FIG. 10B is given by way of one example, but the foregoing does not apply to mapping of the variety of functions to the MME/SAE gateway and the function realizing elements as well.

<<Determination of Timer Value>>

Next, the way of how the data forwarding period designating timer value (the forwarding period) is determined will be discussed. The timer value is determined corresponding to, e.g., a QoS (Quality of Service) type established by the mobile station. Alternatively, the timer value can be calculated from the traffic volume of the user data on the downlink which streams toward the mobile station.

(1) Determination of the Timer Value Corresponding to QoS Type

FIGS. 11A, 11B and 11C are diagrams each illustrating one example of a timer value selection table.

The timer value selection table is previously stored in the controller (including a storage unit) 125 depicted in FIG. 10A. Reference to the timer value selection table is triggered by, e.g., an event that the base station receives the "Measurement Report" (HO startup request) from the mobile station, which aims at determining the data forwarding period designating timer value of which the source base station should notify the target base station and the MME/SAE gateway as well.

The timer value selection table illustrated in each of FIGS. 11A-11C is stored with the timer value associated with the QoS type utilized by the HO target mobile station. In the example of the table illustrated in FIG. 11A, the table is stored with the specified timer values associated with the QoS types such as "VoIP", "Video over IP", "Streaming, "WWW" and "FTP".

The base station selects and determines, based on the call type (QoS) established by the mobile station concerned, the should-be-notified timer value when the HO startup request is given from the mobile station. The timer value stored in the table is used, e.g., fixedly. Alternatively, the timer value is updated corresponding to the necessity by, e.g., the operator of the base station.

The table example illustrated in FIG. 11A is utilized in a case of applying the same timer value to both of the X2 interface (the target base station) and the S1 interface (the MME/SAE gateway).

By contrast, the table example depicted in FIG. 11B is applied in order to select and determine the different timer values with respect to each of the X2 interface (the target base station) and the S1 interface (the MME/SAE gateway). The table example depicted in FIG. 11B is used in a case of determining the timer value in a way that takes into consideration, e.g., a transmission path delay difference between the S1 interface and the X2 interface and a difference in transmission capacity between the respective interfaces.

In the table example illustrated in FIG. 11C, the table is stored with the timer value specified for the S1 interface on the occasion of determining the different timer values with respect to each of the S1 interface and the X2 interface, and is also stored with an offset value for determining the timer value related to the X2 interface on the basis of this timer value. In the example illustrated in FIG. 11C, the offset value for the X2 interface is set based on the S1 interface. By contrast, the table may also be stored with the timer value per QoS related to the X2 interface and with the offset value for determining the S1 interface on the basis of this timer value.

(2) Optimal Value Setting Method of Timer Value

A substitute for the method of selecting the should-be-specified timer value from the table (the timer value selection table) stored with the timer value, can involve applying a method of calculating and adopting the timer value corresponding to a traffic volume of the traffic actually streaming toward the mobile station.

One example is that a line capacity corresponding to the QoS can be uniquely determined (e.g., in the course of ensuring (establishing the call) the communication line in response to the request given from the mobile station, the line capacity corresponding to the QoS can be known). It is, however, unknown that the mobile station concerned actually performs the communications by using thoroughly the intermittently-ensured line capacity. It is therefore considered that not only the timer value is uniquely determined but also the timer value is controlled in real time according to a result of measuring a traffic volume.

For example, a usable technique is that the timer value is increased or decreased corresponding to a traffic status (the result of measuring the data traffic volume) of the target base station within a certain period at a point of time when the source base station receives the HO startup request from the mobile station.

In an idea taking into account the operation of the communication traffic such as this, when the mobile station in the process of actually performing the data communications (high traffic) starts the handover process and if the traffic volume (an activity ratio of the resource) is low for the communication line capacity (a resource quantity) ensured for the mobile station concerned, it is preferable to optimize the data forwarding quantity between the base stations and the set value of the data forwarding period when in the HO process.

The application of the method described above enables the timer value to be optimized (the timer value can be restrained from being excessive and deficient) in accordance with an actual data stream rate and implementation of the data forwarding management suited to the status of the HO target base station.

FIG. 12 is a flowchart illustrating a processing example of the base station in order to determine the timer value corresponding to the traffic volume. In the flowchart illustrated in FIG. 12, the traffic measuring function unit (traffic measuring unit (measuring unit)) 126 and the call process control function unit (call processing controller (call controller)) 127 within the base station, execute the processes in parallel.

The call processing controller 127 executes, when the communication call with the mobile station is established, the call process related this call. On the other hand, the traffic measuring unit 126 measures, after the communication call has been established, the traffic volume about this communication call according to the necessity.

The traffic measuring unit 126 starts, upon a trigger of reaching the specified timing since the origination of the call, measuring the traffic volume on the downlink to the mobile station (OP 101).

The traffic measuring unit 126 measures a period of time equivalent to one cycle of a previously specified measurement report cycle and also measures the traffic volume (OP 102). When the time equivalent to one cycle elapses (OP 102: Yes), the traffic measuring unit 126 generates traffic measurement report data (OP 103) and stores the traffic measurement report data in a specified storage area (memory) (OP 104).

Thereafter, if the call processing controller 127 accesses the memory (OP 105: Yes), the traffic measuring unit 126 invokes the traffic measurement report data (traffic measurement value) from the memory and supplies the data to the call process control unit 127 (OP 106). Thereafter, the processing proceeds to OP 107.

Whereas if no access to the memory is made (OP 105: No), the traffic measuring unit 126 determines whether the measurement report is finished or not (OP 107). Herein, for instance, it is determined whether or not the traffic measurement report of a specified count n (n≧1) is given to the call process control unit 127.

If determined to be finished (OP 107: Yes), the traffic measuring unit 126 terminates the process (OP 108). Whereas if the measurement report is determined not to be finished (OP 107: No), the processing loops back to S102, in which the traffic volume at the next cycle is measured. The memory is stored with the traffic measurement report data (traffic measurement value) per cycle and is given the traffic measurement value responding to the request of the call processing controller 127 in OP 106.

On the other hand, the call processing controller 127 executes the following processes. The call processing controller 127, when determining that a call process event occurs (OP 201: Yes), determines whether or not this call process event is the HO process (the reception of the "Measurement Report") (OP 202).

If the call process event is not the HO process (OP 202: No), the call processing controller 127 performs the call process control other than the HO process corresponding to the call process event (OP 211). Whereas if the call process event is the HO process (OP 202: Yes), the call processing controller 127 carries out the HO process control (OP 203).

Next, the call processing controller 127 decides the QoS information (QoS type) of the HO target base station (OP 204). The QoS type is acquired from a "QoS Type" field contained in the call type information on the HO target call retained by the base station (recording unit) when establishing the call. The acquisition of the QoS type can involve utilizing a variety of existing QoS type determining methods.

Next, the call processing controller 127 starts collecting the traffic information when the target mobile station establishes the connection within the self-cell (which is the area covered by the base station itself) (OP 205). For example, the call processing controller 127 collects the traffic volume of the traffic directed to the mobile station in a specified period necessary for determining the timer value.

The call processing controller 127 determines whether or not an instruction (a measurement information collecting request) requesting the traffic measuring unit to supply the traffic measurement report data, is given to this traffic measuring unit (OP 206), and, if necessary for giving the measurement information collecting request (OP 206: Yes), gives this measurement information collecting request to the traffic measuring unit. When the measurement information collecting request is given, the processing proceeds to OP 207.

The call processing controller 127 determines in OP 207 whether the collection of the measurement information is completed or not. At this time, if the collection of the measurement information is not yet completed, the processing loops back to OP 206, and, whereas if collection of the measurement information is finished, the processing proceeds to OP 208.

In the loop process in OP 206 and OP 207, the call processing controller 127 obtains the traffic measurement report data (the traffic measurement value) for the cycles needed for calculating the timer value. The traffic volume (a data stream size) necessary for calculating the timer value can involve using a traffic volume (a data stream size) at a certain single cycle. Alternatively, a total value of the traffic volumes at a plurality of cycles can be also used. Further alternatively, an average value at the plurality of cycles can be also employed. The traffic measuring unit 126 calculates the total value and the average value, and results of the calculations may be stored in the memory, and the call process control unit 127 may also calculate these values on the basis of the traffic measurement report data at the respective cycles.

In OP 208, the call processing controller 127 calculates the timer value which becomes the data forwarding period designating timer value (details of which will be described later on).

When the timer value is calculated, the call processing controller 127 generates the message containing the timer value as the data forwarding period designating timer value (OP 209) and transmits the message (OP 210).

With respect to the process (the calculation of the timer value) in OP 208, an available scheme is that a table is previously prepared, which is stored with the timer value associated with the traffic volume (the measurement report value: the data stream size) for calculating the timer value obtained at the point of time when completing the collection of the measurement information, and the timer value associated with the traffic volume is extracted from the table. FIG. 13 illustrates a table 50 by way of one example of the table. The table 50 is stored with the timer value associated with the QoS type and the data stream size.

Figure 14:
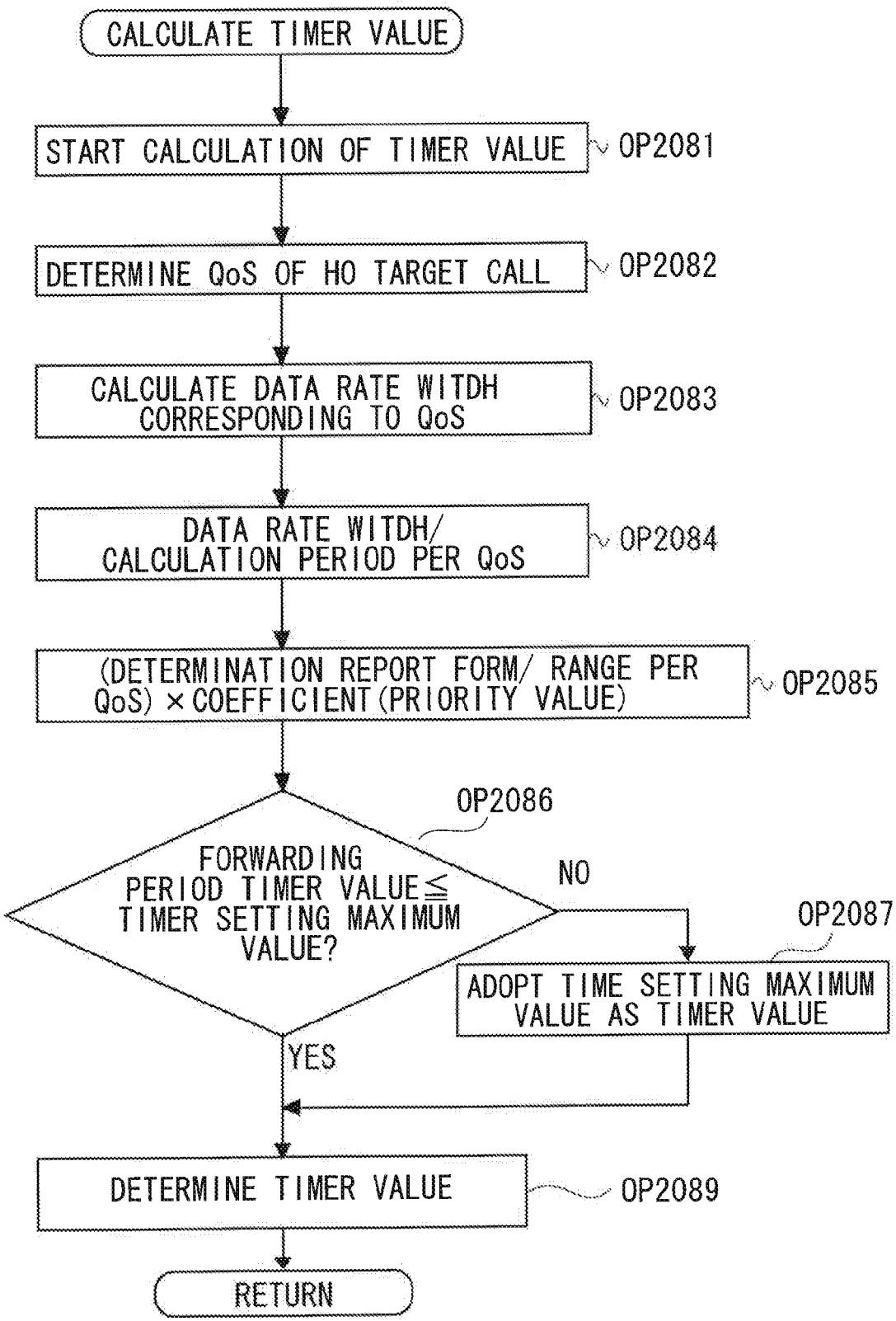
FIG. 14 is a flowchart illustrating an example of a timer value calculation process.

Alternatively, the following method of calculating the data forwarding period designating timer value can be applied. FIG. 14 a flowchart illustrating the timer value calculation method (the detailed process in OP 208), and FIG. 15 is a diagram illustrating an example of the table (a table 60) stored with the parameters needed for calculating the timer value depicted in FIG. 14.

The input information (input necessary information) necessary for calculating the timer value and the parameters (necessary setting parameters) illustrated in FIG. 14 can be specified, e.g., as below.

(A) Input Necessary Information (i) Service (QoS) information which requires the HO call and the data forwarding process.

(ii) The traffic measurement result (Traffic Volume Measurement Result).

Note that the information (i) is acquired in OP 204 of FIG. 12, and the information (ii) is acquired in OP 207 of FIG. 12.

(B) Necessary Setting Parameter (i) A per-QoS data size (Data Rate) width (Minimum Data Rate/Maximum Data Rate).

(ii) A per-QoS priority for the timer calculation (Priority Value (Parameter A)).

(iii) A per-QoS period parameter for calculating the calculation value (Calculation Period).

(vi) A reference value of the timer value.

(v) A timer setting maximum value (Timer Maximum Value).

A possible scheme is that the parameters described above are previously stored in the storage device (the memory: the storage unit in FIG. 10B) of the base station, and the call process control unit 127 can refer to the parameters on the occasion of calculating the timer value.

(C) FIG. 16 illustrates one example of a timer value (Forwarding Period Timer Value) calculation formula using the items of information (A) and (B) by way of a calculation formula. The calculation formula depicted in FIG. 16 is one example, and the calculation can be also made by use of other calculation formulae.

In FIG. 14, the call processing controller 127, when starting the calculation of the timer value (OP 2081), determines the QoS type of the HO target call (OP 2082). This determination can involve applying the determined content of the QoS type in OP 204 of FIG. 12.

Next, the call processing controller 127 calculates a data rate width associated with the QoS type (OP 2083). To be specific, the call processing controller 127 reads a maximum data rate and a minimum data rate each associated with the QoS type from the table 60 illustrated in FIG. 15, and calculates the data rate width.

Subsequently, the call processing controller 127 reads a calculation period (Calculation Period) for the calculation value associated with the QoS type from the table 60, and obtains a per-QoS range value (a range associated with the QoS type) in a way that divides the data rate width by the calculation period for the calculation value (OP 2084).

Next, the call processing controller 127 calculates a value in a way that divides the range value associated with the QoS type by the measurement report value (the traffic measurement value), and multiplies the thus-calculated value by a weight coefficient associated with the QoS type, which is read from the table 60 (OP 2085). Thus, the forwarding period timer value is calculated.

Subsequently, the call processing controller 127 determines whether the forwarding period timer value is equal to or smaller than the timer setting maximum value read from the table 60 (OP 2086). At this time, if the forwarding period timer value is equal to or smaller than the timer setting maximum value (OP 2086: Yes), this forwarding period timer value is determined to be the data forwarding period designating timer value of which the target base station and the MME/SAE gateway should be notified.

Where as if the forwarding period timer value is not equal to or smaller than the timer setting maximum value (OP 2086: No), the call processing controller 127 deems the forwarding period timer value to be the timer setting maximum value (OP 2087) and determines the timer setting maximum value as the data forwarding period designating timer value. Thereafter, the processing proceeds to OP 209 (FIG. 12).

(Control Method of Restraining Forwarding Period without Notifying of Timer Value)

A timer value selection table for determining the data forwarding period designating timer value related to the X2 interface as illustrated in FIGS. 11A, 11B and 11C can be managed on a per-base-station basis. Further, the contents stored in the timer value selection table can be communized within the mobile communication system or between a group of base stations belong to a certain area.

If the contents of the timer value selection table are standardized, the following configuration may also be adopted. To be specific, through notification of X2-AP information (communication line information/call information etc of the mobile station that is required on the side of the target base station) addressed to the mobile station, which is contained in the "Handover Request") accompanying the HO process, the target base station reads, based on the QoS information (QoS type) contained in the X2-AP information, the data forwarding period designating timer value from the timer selection table in the X2 interface, and can define by itself the readout timer value.

Figure 17:
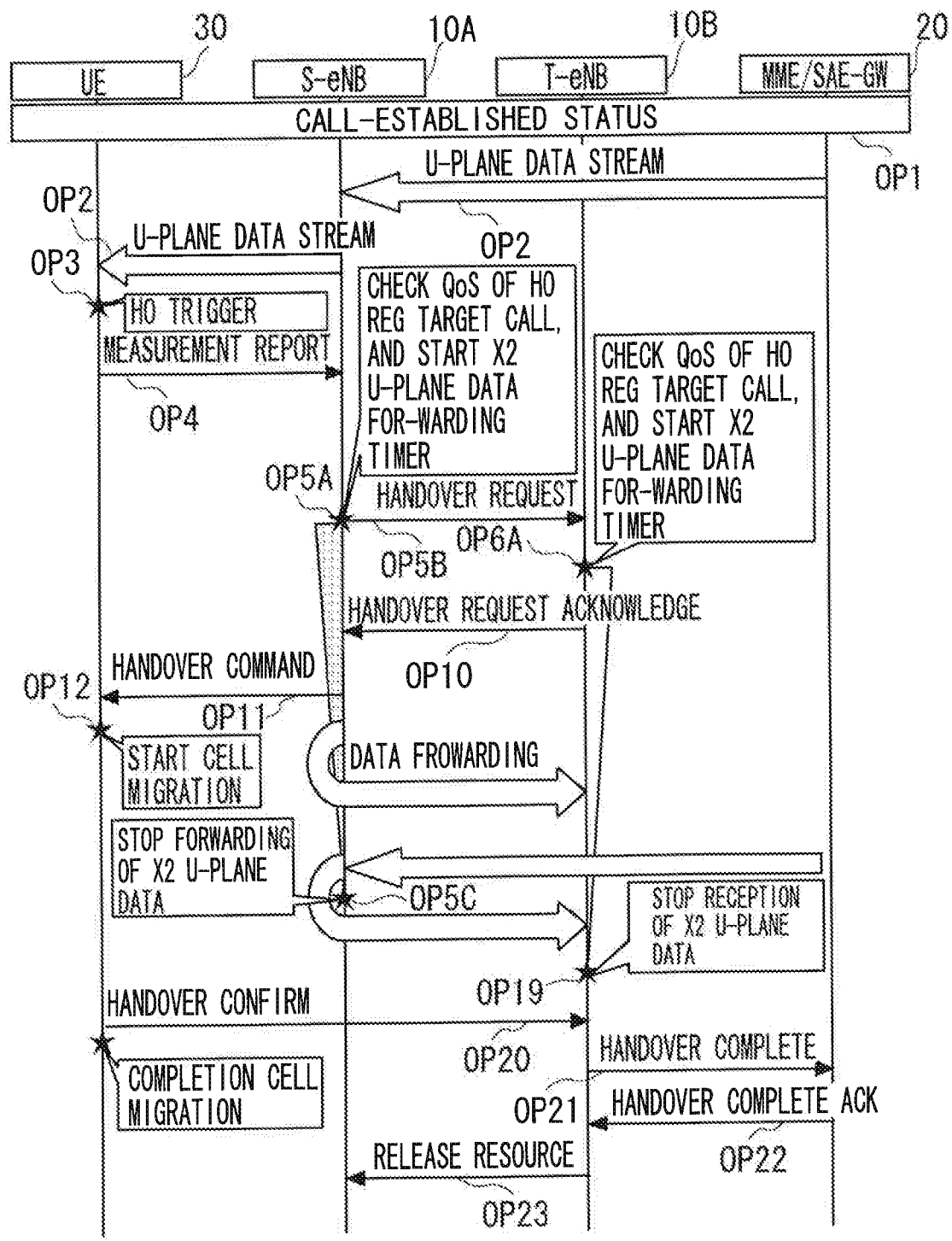
FIG. 17 is a sequence diagram illustrating an operational example in another embodiment.

If the parameters (the contents stored in the table) retained in the timer value selection table are common, without additional information (the transmission and reception of Message/Parameter), the optimization (restraint) of the data forwarding period can be realized. FIG. 17 is a sequence diagram illustrating an operational example of the mobile communication system in the case discussed above.

An operational example illustrated in FIG. 17 is different from the example given in FIG. 7 in terms of the following points. For example, in OP 5A of FIG. 17, the source base station 10A determines the data forwarding period designating timer value by use of the timer value selection table. This determining method is the same as the operational example in FIG. 7. The source base station 10A, however, starts measuring the data forwarding period designating timer value by the timer. The source base station 10A transmits the "Handover Request" (containing the QoS information) containing none of the data forwarding period designating timer value to the target base station 10B (FIG. 17: OP 5B).

The source base station 10A forwards the user data coming in from the MME/SAE gateway to the target base station at the specified timing after receiving the "Handover Request ACK" from the target base station 10B. If the timer set in OP 5A exceeds the data forwarding period designating timer value, however, the forwarding of the user data is stopped (FIG. 17: OP 5C).

On the other hand, the target base station 10B extracts the QoS type contained in the "Handover Request" received from the source base station 10A, then reads the timer value associated with the extracted QoS type from the timer value selection table, and defines the timer value as a timer period (reception allowable period) of waiting for the forwarding data from the source base station 10A, thus setting the timer (FIG. 17: OP 6A). Thereafter, if the timer comes to the timeout, the target base station 10B stops the process of receiving the forwarding data from the source base station 10A (FIG. 17: OP 19).

The method (another embodiment) illustrated in FIG. 17 has, as compared with the method depicted in FIG. 7, a merit of restraining an increase (including an increment of control Bit) in transmitting and receiving the message between the devices.

(Method of Restraining Data Forwarding Period by Notifying of Traffic Information of HO Target Mobile Station)

The following scheme can be adopted as a method (embodiment) different from the foregoing method by which the source base station notifies the target base station of the data forwarding period designating timer value related to the HO target mobile station (FIG. 7) and the foregoing method by which the source base station notifies the target base station of the QoS information of the mobile station to thereby define the unique timer value on the side of the target base station (FIG. 17).

The operational example gives the same operation as in the sequence diagram as illustrated in FIG. 17. The following points are, however, different.

The source base station 10A, upon receiving the HO startup request from the mobile station, calculates the data forwarding period designating timer value through the process as depicted in FIG. 12, and starts the timer based on this timer value (FIG. 17: OP 5A). The calculation of the timer value can involve arbitrarily selecting and executing the method using the table 50 (FIG. 13) and the methods (FIGS. 14-16) of calculating the timer value. The source base station 10A stops forwarding the data when the timer reaches the timeout.

Further, the source base station 10A notifies the target base station 10B of the "Handover Request (X2-AP)" containing the traffic measurement result (traffic measurement report value) used for calculating the timer value (FIG. 17: OP 5B).

The target base station 10B receiving the "Handover Request (X2-AP)" extracts the traffic measurement result and reads, with this traffic measurement result being used as the input information, the timer value from the table 50 (FIG. 13), or alternatively calculates the timer value by the calculation methods explained with reference to FIGS. 14-16. Then, the target base station 10B starts measuring the obtained timer value (the reception allowable period), and executes the process of receiving the forwarding data arriving via the X2 interface from the source base station 10A till timer gets into the timeout (when the timer reaches the timeout, the reception of the forwarding data is stopped (FIG. 17: OP 19)).

In the case of applying the schemes and methods such as this, the message transmission/reception quantity is restrained, while the target base station can define the reception allowable period of the data forwarded from the X2 interface in a way that takes the traffic volume of the mobile station into consideration. The reception period with no futility can be thereby set.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention have been described in detail, it should be understood that the various changes, substitutions, and alterations could be made hereto without departing from the spirit and scope of the invention.

What is claimed is:

1. A mobile communication system, comprising:
a first wireless base station connected to a superior apparatus and serving as a handover source station for a mobile station; and
a second wireless base station connected to the superior apparatus and serving as a handover target station for the mobile station, the mobile station establishing a wireless connection with one of the first and second wireless base stations by use of a wireless channel shared between or among a plurality of mobile stations,
wherein the first wireless base station forwards data received from the superior apparatus and addressed to the mobile station to the mobile station in a case of receiving none of a handover request message from the mobile station keeping the wireless connection with the first wireless base station itself, and the first wireless base station forwards a part or a whole of data addressed to the mobile station and received from the superior apparatus after receiving the handover request message to the second wireless base station in a case of receiving the handover request message from the mobile station and transmitting a handover process request message in response to this handover request message to the second wireless base station,
the second wireless base station forwards, through a handover process corresponding to the handover process request message sent from the first wireless base station, both of the data forwarded from the first wireless base station and the data transmitted from the superior apparatus and addressed to the mobile station by switching over a data transmission destination in the superior apparatus through the handover process to the mobile station of which the wireless connection with the first wireless base station is switched over to the wireless connection with the second wireless base station itself, and
the first wireless base station notifies the second wireless base station of information used for the second wireless base station to determine a reception allowable period of the part of or the whole of data addressed to the mobile station, received from the superior apparatus and forwarded by the first wireless base station,
wherein the reception allowable period is determined on the basis of a data forwarding period, of which the first wireless base station notifies of as the information, used for the first wireless base station forwarding data to the second wireless base station.

2. A wireless base station connected together with another wireless base station to a superior apparatus, comprising:
a forwarding controller to forward data received from the superior apparatus and addressed to a mobile station to the mobile station in a case of receiving none of a handover request message from the mobile station connected to the wireless base station itself by use of a wireless channel shared between or among a plurality of mobile stations, and to forward a part or a whole of data received from the superior apparatus after receiving the handover request message to the another wireless base station in a case of receiving the handover request message from the mobile station and transmitting a handover process request message in response to this handover request message to another wireless base station defined as a handover destination; and
a notifying unit to notify the another wireless base station of information used for the another wireless base station to determine a reception allowable period of the part of or the whole of data addressed to the mobile station, received from the superior apparatus, and forwarded by the wireless base station, wherein the reception allowable period is determined on the basis of a data forwarding period, of which the wireless base station notifies of as the information, used for the wireless base station forwarding data to the another wireless base station.

3. The wireless base station according to claim 2, wherein the notifying unit notifies the superior apparatus of information used for the superior apparatus to determine a transmission stop timing of the data for the wireless base station receiving the handover request message from the mobile station.

4. The wireless base station according to claim 2, wherein the notifying unit notifies at least the another wireless base station in the superior apparatus and the another wireless base station of information representing the data forwarding period of the another wireless base station from the wireless base station.

5. The wireless base station according to claim 2, further comprising a determining unit determining the data forwarding period of the another wireless base station from the wireless base station on the basis of a quality-of-service type of the mobile station.

6. The wireless base station according to claim 5, further comprising a storage unit stored with the data forwarding period associated with the quality-of-service type,
wherein the determining unit obtains the quality-of-service type contained in the call type information of the mobile station that is retained by the wireless base station, and reads the data forwarding period associated with the quality-of-service type from the storage unit to thereby determine the data forwarding period.

7. The wireless base station according to claim 3, further comprising a determining unit determining, based on the quality-of-service type of the mobile station and a traffic volume of traffic directed to the mobile station, the data forwarding period of the data forwarded from the wireless base station to the another wireless base station.

8. The wireless base station according to claim 7, further comprising:
a storage unit to be stored with the data forwarding period associated with the quality-of-service type and the traffic volume; and
a measuring unit to measure the traffic volume,
wherein the determining unit obtains the quality-of-service type contained in the call type information of the mobile station that is retained by the wireless base station, and reads the data forwarding period associated with the quality-of-service type and the traffic volume obtained by the measuring unit from the storage unit to thereby determine the data forwarding period.

9. The wireless base station according to claim 7, further comprising:
a measuring unit to measure the traffic volume, and
a storage unit to be stored with a plurality of parameters necessary for calculating the data forwarding period,
wherein the determining unit obtains the quality-of-service type contained in the call type information of the mobile station that is retained by the wireless base station, then reads the plurality of parameters associated with the quality-of-service type from the storage unit, and calculates the data forwarding period from the plurality of readout parameters and the traffic volume measured by the measuring unit.

10. The wireless base station according to claim 6, wherein the notifying unit notifies the another wireless base station of the quality-of-service type of the mobile station as the information used for the another wireless base station to determine the reception allowable period of the data forwarded from the wireless base station if the another wireless base station comprises the storage unit and the determining unit.

11. The wireless base station according to claim 8, wherein the notifying unit notifies the another wireless base station of the quality-of-service type and the traffic volume of the mobile station as the information used for the another wireless base station to determine the reception allowable period of the data forwarded from the wireless base station if the another wireless base station comprises the storage unit, the measuring unit and the determining unit.

12. A wireless base station connected together with another wireless base station to a superior apparatus and establishing a wireless connection by use of a wireless channel shared between or among a plurality of mobile stations, the wireless base station comprising:
   a handover processing unit to execute a handover process corresponding to a handover process request message of a handover target mobile station that is received from the another wireless base station;
   a receiving unit to receive, after receiving a handover request message, forwarding data forwarded from the another wireless base station;
   a determining unit to determine, based on information of which the another wireless base station notifies, a reception allowable period for allowing the receiving unit to receive the forwarding data that is a part of or a whole of data addressed to the handover target mobile station and received by the another wireless base station from the superior apparatus, wherein the determining unit determines the reception allowable period on the basis of a data forwarding period, of which the another wireless base station notifies of as the information, used for the another wireless base station to forward the forwarding data to the wireless base station itself; and
   a forwarding unit to forward, through a handover process, both of the forwarding data received from the another wireless base station within the reception allowable period and the directed-to-the-mobile-station data transmitted from the superior apparatus due to switchover of a data transmission destination in the superior apparatus through the handover process to the handover target base station of which the wireless connection with the wireless base station itself is established through the handover process.

13. A superior apparatus connected to a first wireless base station and a second wireless base station that are wirelessly connected to a mobile station by use of a wireless channel shared between or among a plurality of mobile stations, the superior apparatus comprising:
   a transmitting unit to transmit data directed to the mobile station wirelessly connected to the first wireless base station to the first wireless base station; and
   a determining unit to determine a data transmission stop timing of the data transmitted from the superior apparatus to the mobile station via the first wireless base station on the basis of information of which the first wireless base station notifies when the first wireless base station receives a handover request message from the mobile station and transmits a handover process request message in response to the handover request message to the second wireless base station, wherein the determining unit determines the data transmission stop timing on the basis of a data forwarding period for forwarding the data, of which the first wireless base station notifies as the information, received from the superior apparatus and forwarded by the first wireless base station for the second wireless base station,
   wherein the transmitting unit stops transmitting the data transmitted from the superior apparatus to the mobile station via the first wireless base station at the data transmission stop timing and starts transmitting the data transmitted from the superior apparatus to the mobile station via the second wireless base station in accordance with a handover process executed by the second wireless base station.

* * * * *